(12) United States Patent
Yoshizawa et al.

(10) Patent No.: US 12,197,116 B2
(45) Date of Patent: Jan. 14, 2025

(54) IMAGE EXPOSURE DEVICE, IMAGE EXPOSURE METHOD, AND PROGRAM

(71) Applicant: FUJIFILM CORPORATION, Tokyo (JP)

(72) Inventors: Hirotoshi Yoshizawa, Kanagawa (JP); Shinichiro Sonoda, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 129 days.

(21) Appl. No.: 17/673,736

(22) Filed: Feb. 16, 2022

(65) Prior Publication Data
US 2022/0171274 A1    Jun. 2, 2022

Related U.S. Application Data

(63) Continuation of application No. PCT/JP2020/036594, filed on Sep. 28, 2020.

(30) Foreign Application Priority Data

Sep. 27, 2019 (JP) .................................. 2019-177694

(51) Int. Cl.
    *G03B 27/73* (2006.01)
    *G03B 27/04* (2006.01)
(52) U.S. Cl.
    CPC .............. *G03B 27/73* (2013.01); *G03B 27/04* (2013.01)
(58) Field of Classification Search
    CPC .......... G02B 5/00; G03B 17/52; G03B 27/04; G03B 27/16; G03B 27/725; G03B 27/73; G03B 17/48; G03B 27/32; G03B 27/72
    See application file for complete search history.

(56) References Cited

U.S. PATENT DOCUMENTS

| 4,942,462 A | 7/1990 | Shiota |
| 5,386,301 A * | 1/1995 | Yuasa .................. H04N 1/4053 |
| | | 358/448 |

(Continued)

FOREIGN PATENT DOCUMENTS

| JP | S63-123034 A | 5/1988 |
| JP | S64-77382 A | 3/1989 |

(Continued)

OTHER PUBLICATIONS

Extended European Search Report dated Oct. 17, 2022, issued in corresponding EP Patent Application No. 20870327.2.

(Continued)

*Primary Examiner* — Deoram Persaud
(74) *Attorney, Agent, or Firm* — SOLARIS Intellectual Property Group, PLLC

(57) ABSTRACT

There are provided an image exposure device, an image exposure method, and a program, the image exposure device including: an image display device; a support portion that supports a photosensitive recording medium for recording an image displayed on the image display device in a state in which an exposure surface thereof faces the image display device; a louver film that is provided between the image display device and the support portion and limits an angle of light radiated from the image display device; an image generation unit that generates a display image in which an image quality of a color input image is deteriorated by emphasizing a density difference of a high-frequency component of the input image; and a controller that performs a control for generating an image of an R component, an image of a G component, and an image of a B component from the display image and sequentially displaying each of the image of the R component, the image of the G component, and the image of the B component on the image display (Continued)

INPUT IMAGE    BLURRED IMAGE    HIGH-FREQUENCY COMPONENT IMAGE device in a predetermined order to sequentially expose the photosensitive recording medium.

15 Claims, 18 Drawing Sheets

(56) References Cited

U.S. PATENT DOCUMENTS

| | | | |
|---|---|---|---|
| 6,999,113 B1 | 2/2006 | Omura | |
| 9,126,396 B2 | 9/2015 | Degani et al. | |
| 2006/0290906 A1 | 12/2006 | Yokoyama et al. | |
| 2009/0070995 A1* | 3/2009 | Kumagai | H10K 71/13 |
| | | | 29/846 |
| 2011/0123111 A1 | 5/2011 | Sibiryakov et al. | |
| 2011/0150349 A1* | 6/2011 | Kojima | G06V 40/161 |
| | | | 382/224 |
| 2013/0202204 A1* | 8/2013 | Yamanaka | G06T 5/90 |
| | | | 382/167 |
| 2017/0111547 A1* | 4/2017 | Otani | H04N 1/6038 |
| 2020/0201188 A1 | 6/2020 | Usami et al. | |
| 2020/0238684 A1 | 7/2020 | Usami et al. | |
| 2020/0394768 A1 | 12/2020 | Yoshizawa et al. | |
| 2022/0368821 A1* | 11/2022 | Yoshizawa | H04N 23/10 |
| 2023/0162333 A1* | 5/2023 | Kuan | G06T 7/11 |
| | | | 382/167 |
| 2023/0185179 A1* | 6/2023 | Yoshizawa | G06T 5/75 |
| | | | 355/44 |
| 2023/0412751 A1* | 12/2023 | Mizoguchi | G06K 15/1876 |

FOREIGN PATENT DOCUMENTS

| | | |
|---|---|---|
| JP | 2000-196980 A | 7/2000 |
| JP | 2001-092016 A | 4/2001 |
| JP | 2009-037011 A | 2/2009 |
| JP | 2016-224259 A | 12/2016 |
| WO | 2019/059168 A1 | 3/2019 |
| WO | 2019/093027 A1 | 5/2019 |
| WO | 2019/187751 A1 | 10/2019 |

OTHER PUBLICATIONS

International Search Report issued in International Application No. PCT/JP2020/036594 on Nov. 10, 2020.
Written Opinion of the ISA issued in International Application No. PCT/JP2020/036594 on Nov. 10, 2020.
Office Action dated Nov. 22, 2024, issued by the EPO in corresponding EP Patent Application No. 20870327.2.

* cited by examiner

DISPLAY IMAGE → RECORED IMAGE

INPUT IMAGE    BLURRED IMAGE

HIGH-FREQUENCY
COMPONENT IMAGE

DISPLAY IMAGE

IMAGE EXPOSURE DEVICE, IMAGE EXPOSURE METHOD, AND PROGRAM

CROSS-REFERENCE TO RELATED APPLICATION

This application is a continuation application of International Application No. PCT/JP2020/036594, filed Sep. 28, 2020, the disclosure of which is incorporated herein by reference in its entirety. Further, this application claims priority from Japanese Patent Application No. 2019-177694 filed on Sep. 27, 2019, the disclosure of which is incorporated herein by reference in its entirety.

BACKGROUND

1. Technical Field

The present disclosure relates to an image exposure device, an image exposure method, and a program.

2. Description of the Related Art

For the exposure of photographs, photomasks, or the like, a projection optical system that is an optical system of an image forming system is being used. However, in a case of the projection optical system, an optical system such as a lens is required between a display image displayed by an image display device and a photosensitive material such as a photosensitive recording medium, and a large volume becomes necessary. In a case of exposing a pattern such as a semiconductor or the like with a photomask, the mask is brought into close contact with or almost brought into close contact with the photosensitive material. At the time of exposure, a gap or a protective plate is provided between the photosensitive material and the mask pattern, and parallel light is projected, thereby suppressing blurring of the exposed image.

In addition, in light emitted from a light source, light emitted in parallel with the photosensitive material is used to radiate and expose the photosensitive material, thereby suppressing blurring of an exposed recorded image. For example, JP2009-37011A and U.S. Pat. No. 9,126,396B disclose a technique in which an image display device such as an optical fiber array is installed between a photosensitive material and a display image displayed on an electronic display or the like, and in light radiated from the display toward the photosensitive material, parallel light from the display toward the photosensitive material is selected (collimated), and the photosensitive material is irradiated. The techniques disclosed in JP2009-37011A and U.S. Pat. No. 9,126,396B can suppress bleeding of the exposed recorded image.

SUMMARY

As described above, in a case where light radiated from the image display device is collimated by limiting the light with a limiting member, light transmitted through the limiting member may be diffused depending on the structure of the limiting member. Therefore, in the recorded image recorded on the photosensitive recording medium, the density difference becomes small, and the image may be a so-called blurred image with reduced visibility of an edge portion.

The techniques disclosed in JP2009-37011A and U.S. Pat. No. 9,126,396B may not be able to suppress the blurring of the recorded image caused by the diffusion of the light transmitted through the limiting member.

In particular, in a case of trying to suppress the occurrence of so-called gradation skipping in the recorded image, the change in color shading is reduced, and as a result, the recorded image may be blurred.

The present disclosure has been made in view of such circumstances, and an object thereof is to provide an image exposure device, an image exposure method, and a program capable of suppressing blurring of a recorded image and suppressing gradation skipping.

According to a first aspect of the present disclosure, there is provided an image exposure device comprising: an image display device having a plurality of pixels; a support portion that supports a photosensitive recording medium for recording an image displayed on the image display device in a state in which an exposure surface of the photosensitive recording medium faces the image display device; a limiting member that is provided between the image display device and the support portion and limits an angle of light radiated from the image display device to the photosensitive recording medium; an image generation unit that generates a display image in which an image quality of a color input image represented by input image data is deteriorated by emphasizing a density difference of a high-frequency component of the input image; and a controller that performs a control for generating an image of an R component, an image of a G component, and an image of a B component from the display image and sequentially displaying each of the image of the R component, the image of the G component, and the image of the B component on the image display device in a predetermined order to sequentially expose the photosensitive recording medium.

According to a second aspect of the present disclosure, in the image exposure device according to the first aspect, a total amount of light for exposing the photosensitive recording medium is determined for each color of RGB, and the controller performs a control such that the photosensitive recording medium is sequentially exposed by each of the image of the R component, the image of the G component, and the image of the B component at an exposure time corresponding to a maximum amount of light of each color of RGB displayed on the image display device and the total amount of light.

According to a third aspect of the present disclosure, in the image exposure device according to the second aspect, the total amount of light is determined based on spectral characteristics of the light radiated from the image display device and a spectral sensitivity of the photosensitive recording medium.

According to a fourth aspect of the present disclosure, in the image exposure device according to any one of the first to third aspects, each of the plurality of pixels includes a sub-pixel corresponding to each of RGB.

According to a fifth aspect of the present disclosure, in the image exposure device according to any one of the first to fourth aspects, the limiting member is an optical member of a diffusion optical system.

According to a sixth aspect of the present disclosure, in the image exposure device according to the fifth aspect, the optical member is a louver film in which first light transmission parts that transmit light and first light shielding parts that shield light are alternately disposed in a first direction on a surface parallel to an arrangement surface where the pixels of the image display device are arranged, and second light transmission parts that transmit light and second light shielding parts that shield light are alternately disposed in a second direction on the surface, the second direction being not parallel to the first direction.

According to a seventh aspect of the present disclosure, in the image exposure device according to the fifth aspect, the optical member is a louver film in which first light transmission parts that transmit light and first light shielding parts that shield light are alternately disposed in a first direction on a surface parallel to an arrangement surface where the pixels of the image display device are arranged, and second light transmission parts that transmit light and second light shielding parts that shield light are alternately disposed in a second direction on the surface, the second direction being perpendicular to the first direction.

According to an eighth aspect of the present disclosure, in the image exposure device according to the sixth or seventh aspect, the louver film is formed by laminating a first layer in which the first light transmission parts and the first light shielding parts are alternately disposed only in the first direction, and a second layer in which the second light transmission parts and the second light shielding parts are alternately disposed only in the second direction.

According to a ninth aspect of the present disclosure, in the image exposure device according to the eighth aspect, the first light shielding parts of the first layer include a plurality of first light shielding members disposed at predetermined intervals along the second direction, and the second light shielding parts of the second layer include a plurality of second light shielding members disposed at predetermined intervals along the first direction.

According to a tenth aspect of the present disclosure, in the image exposure device according to any one of the first to ninth aspects, the controller emphasizes the density difference of the high-frequency component by unsharp masking.

According to an eleventh aspect of the present disclosure, in the image exposure device according to the tenth aspect, in a case where a weight of the unsharp masking is denoted by y and a standard deviation of a degree of a two-dimensional Gaussian distribution used for the unsharp masking is denoted by x, the following expression (1) is satisfied, $$-0.1 \times x + 0.50 \leq y \leq -0.1 \times x + 1.00 \quad (1).$$

According to a twelfth aspect of the present disclosure, in the image exposure device according to the tenth or eleventh aspect, in a case where a weight of the unsharp masking is denoted by y, a standard deviation of a degree of a two-dimensional Gaussian distribution used for the unsharp masking is denoted by x, and a resolution of the image display device is denoted by X pixel per inch (ppi), the following expression (2) is satisfied, $$-0.1 \times x \times (X \div 325) + 0.50 \leq y \leq -0.1 \times x \times (X \div 325) + 1.00 \quad (2).$$

According to a thirteenth aspect of the present disclosure, the image exposure device according to any one of the first to twelfth aspects further comprises a reception unit that receives an instruction on whether to perform batch exposure or the sequential exposure for the exposure of the photosensitive recording medium, the batch exposure exposing the photosensitive recording medium by collectively displaying the image of the R component, the image of the G component, and the image of the B component of the display image on the image display device, in which the controller performs a control such that the photosensitive recording medium is collectively exposed in a case where the reception unit receives an instruction for performing the batch exposure, and performs a control such that the photosensitive recording medium is sequentially exposed in a case where the reception unit receives an instruction for performing the sequential exposure.

According to a fourteenth aspect of the present disclosure, in the image exposure device according to the thirteenth aspect, in a case where the sequential exposure is performed, the image generation unit generates the display image in which the density difference of the high-frequency component is more emphasized than in a case where the batch exposure is performed.

According to a fifteenth aspect of the present disclosure, there is provided an image exposure method in an image exposure device including an image display device having a plurality of pixels, a support portion that supports a photosensitive recording medium for recording an image displayed on the image display device in a state in which an exposure surface of the photosensitive recording medium faces the image display device, and a limiting member that is provided between the image display device and the support portion and limits an angle of light radiated from the image display device to the photosensitive recording medium, the method comprising: generating a display image in which an image quality of a color input image represented by input image data is deteriorated by emphasizing a density difference of a high-frequency component of the input image; and performing a control for generating an image of an R component, an image of a G component, and an image of a B component from the display image and sequentially displaying each of the image of the R component, the image of the G component, and the image of the B component on the image display device in a predetermined order to sequentially expose the photosensitive recording medium.

According to a sixteenth aspect of the present disclosure, there is provided a program for causing a computer to execute a process, the computer controlling an image exposure device including an image display device having a plurality of pixels, a support portion that supports a photosensitive recording medium for recording an image displayed on the image display device in a state in which an exposure surface of the photosensitive recording medium faces the image display device, and a limiting member that is provided between the image display device and the support portion and limits an angle of light radiated from the image display device to the photosensitive recording medium, the process comprising: generating a display image in which an image quality of a color input image represented by input image data is deteriorated by emphasizing a density difference of a high-frequency component of the input image; and performing a control for generating an image of an R component, an image of a G component, and an image of a B component from the display image and sequentially displaying each of the image of the R component, the image of the G component, and the image of the B component on the image display device in a predetermined order to sequentially expose the photosensitive recording medium.

According to an aspect of the present disclosure, there is provided an image exposure device comprising an image display device having a plurality of pixels, a support portion that supports a photosensitive recording medium for recording an image displayed on the image display device in a state in which an exposure surface of the photosensitive recording medium faces the image display device, and a limiting member that is provided between the image display device and the support portion and limits an angle of light radiated from the image display device to the photosensitive recording medium, a memory that stores instructions to be executed by a computer, and a processor configured to execute the stored instructions, in which the processor executes a process of: generating a display image in which an image quality of a color input image represented by input image data is deteriorated by emphasizing a density difference of a high-frequency component of the input image; and performing a control for generating an image of an R component, an image of a G component, and an image of a B component from the display image and sequentially displaying each of the image of the R component, the image of the G component, and the image of the B component on the image display device in a predetermined order to sequentially expose the photosensitive recording medium.

According to the aspects of the present disclosure, it is possible to suppress blurring of a recorded image and suppress gradation skipping.

BRIEF DESCRIPTION OF THE DRAWINGS

Exemplary embodiments according to the technique of the present disclosure will be described in detail based on the following figures, wherein.

DETAILED DESCRIPTION

Hereinafter, an image exposure device of the present embodiment will be described with reference to the drawings.

First Embodiment

Image Exposure Device

Figure 1:
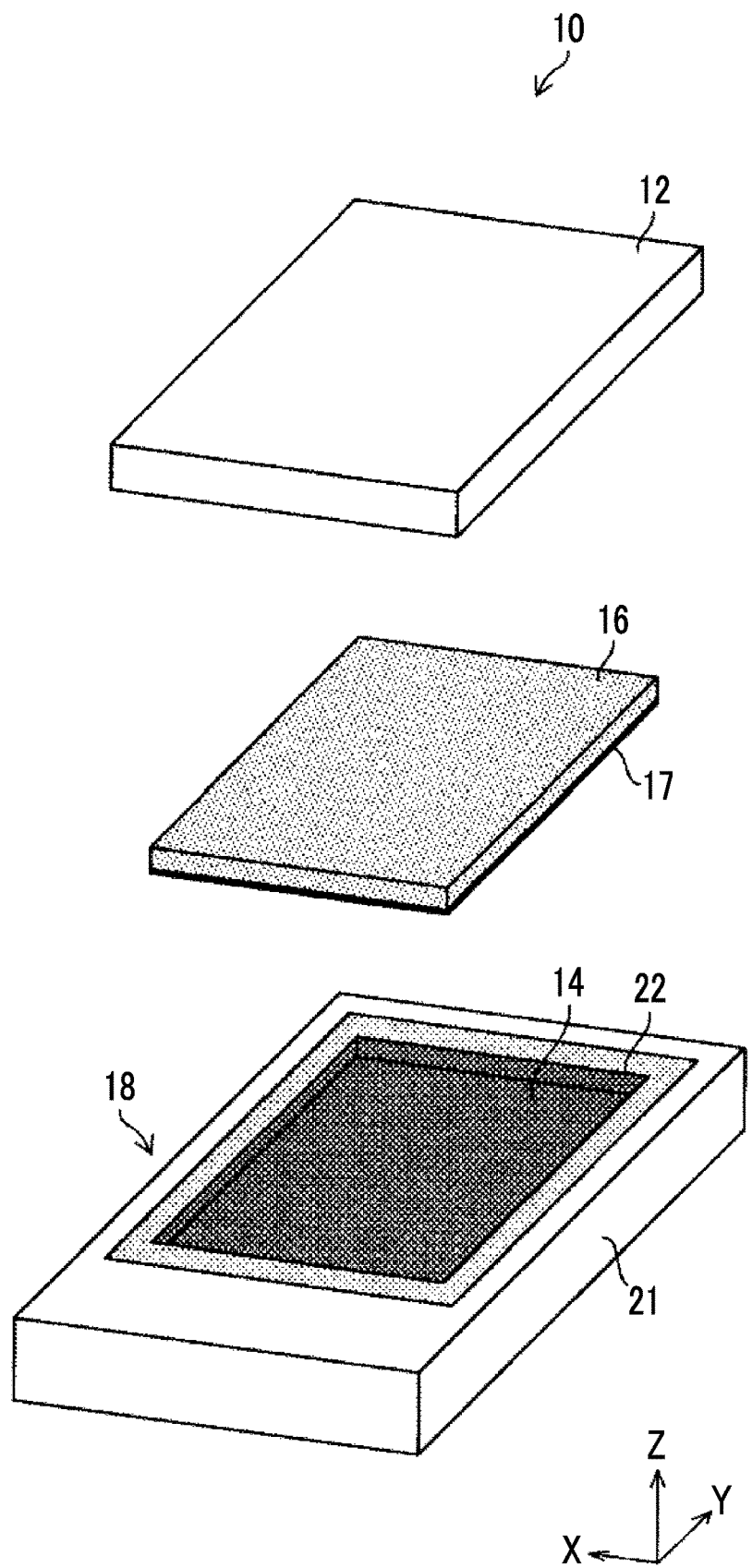
FIG. 1 is an exploded perspective view of an example of an image exposure device of a first embodiment.

First, the configuration of an image exposure device of the present embodiment will be described. FIG. 1 shows an exploded perspective view of an example of the image exposure device of the present embodiment. Further, FIG. 2 shows a cross-sectional view of an example of the image exposure device of the present embodiment.

Figure 2:
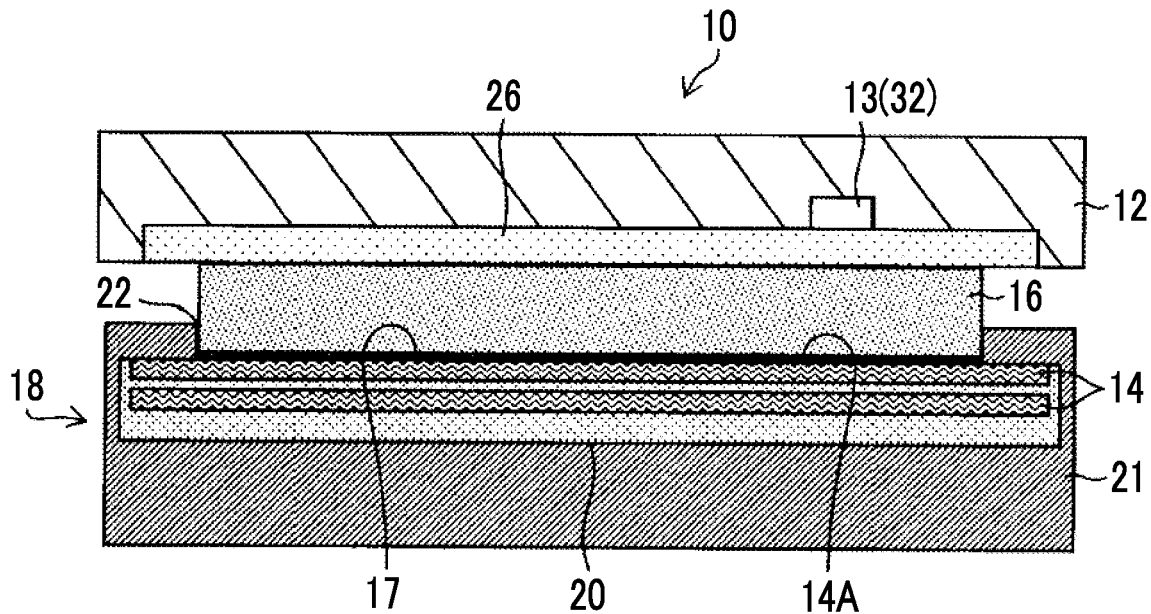
FIG. 2 is a cross-sectional view of an example of the image exposure device of the first embodiment.

As shown in FIGS. 1 and 2, an image exposure device 10 of the present embodiment comprises an image display device 12, a support portion 21, and a louver film 16. The image display device 12 has a plurality of pixels 13. The support portion 21 supports a photosensitive recording medium 14 on which a recorded image corresponding to a display image displayed by the image display device 12 is recorded. The louver film 16 is provided between the image display device 12 and the support portion 21, and a protective layer 17 is provided on the support portion 21 side thereof.

Image Display Device

As the image display device 12 of the present embodiment, a mobile terminal such as a smartphone and a tablet PC, a liquid crystal display (LCD), an organic light emitting diode (OLED), a cathode ray tube (CRT), a light emitting diode (LED), a plasma display device, or the like can be used.

Figure 3:
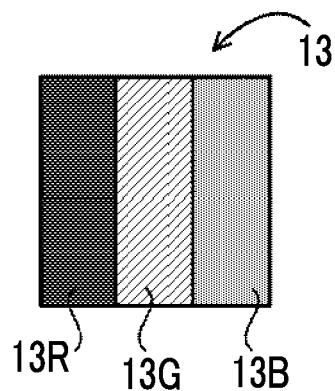
FIG. 3 is a diagram showing an example of a pixel of the first embodiment.

The image display device 12 comprises a plurality of pixels 13 as a display unit 32 for displaying a display image. FIG. 2 shows one pixel 13 as an example of the display unit 32. The pixel 13 is a minimum unit of color information constituting an image display surface. Since the pixel 13 is provided, the image display device 12 can display a display image. FIG. 3 shows an example of the pixel 13 of the present embodiment. The pixel 13 includes three sub-pixels. Specifically, as shown in FIG. 3, in the pixel 13, a sub-pixel 13R corresponding to a red (R) color, a sub-pixel 13G corresponding to a green (G) color, and a sub-pixels 13B corresponding to a blue (B) color are disposed in a row. A plurality of pixels 13 are arranged two-dimensionally on a pixel display surface of the image display device 12. Since the pixel 13 is provided, the image display device 12 can display a color display image. The two-dimensional in the arrangement of the pixels 13 means a state extending in X-Y directions in FIG. 1. By setting the distance (pitch) between the adjacent pixels 13 to 200 μm or less, the impression of the recorded image as a natural image can be strengthened. Therefore, the pitch of the pixel 13 is preferably 150 μm or less, more preferably 125 μm or less, and even more preferably 85 μm or less.

A glass window 26 for protecting the pixel 13 is provided on a surface side irradiated with light from the image display device 12. The thickness of the glass window 26 is preferably thin in order to shorten the distance from the pixel 13 to the photosensitive recording medium 14.

Figure 4:
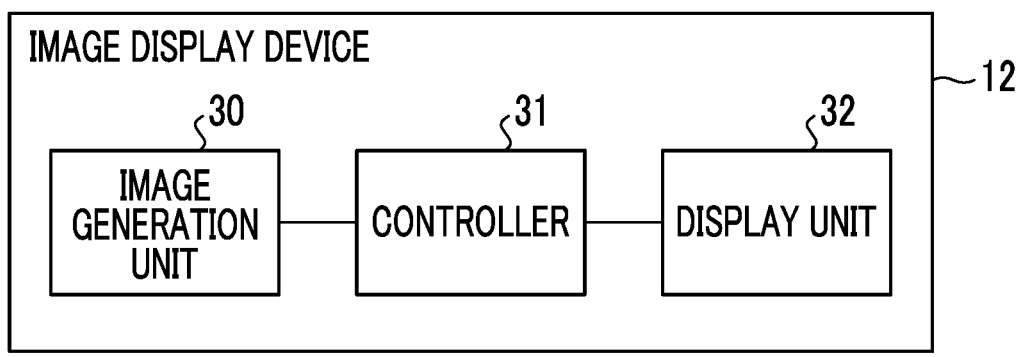
FIG. 4 is a block diagram showing an example of a functional configuration of an image display device of the first embodiment.

In addition, FIG. 4 is a block diagram showing an example of a functional configuration of the image display device 12 of the present embodiment. The image display device 12 of the present embodiment comprises an image generation unit 30, a controller 31, and a display unit 32.

The image generation unit 30 of the present embodiment generates a display image in which an image quality of the input image is deteriorated by emphasizing a density difference of a high-frequency component of the input image, and outputs image data representing the generated display image to the controller 31.

The controller 31 causes the display unit 32 to display a display image represented by the image data input from the image generation unit 30. Further, the controller 31 of the present embodiment generates an image of a red (R) component, an image of a green (G) component, and an image of a blue (B) component from the display image which is a color image. Further, the controller 31 causes the display unit 32 to sequentially display the image of the R component, the image of the G component, and the image of the B component in a predetermined order.

The display unit 32 comprises the above-described pixel 13 and radiates light according to the display image represented by the pixel 13. For the display unit 32, for example, a liquid crystal in which a lamp such as a backlight radiates light may be applied, or for example, a light emitting diode in which the display unit 32 itself radiates light may be applied.

By sequentially displaying each of the image of the R component, the image of the G component, and the image of the B component on the display unit 32, the photosensitive recording medium 14 is sequentially exposed by each of the image of the R component, the image of the G component, and the image of the B component. Hereinafter, this exposure method is referred to as "RGB sequential exposure" for convenience. Although it is referred to as "RGB sequential exposure", the order of exposure is optional and is not limited to the order of RGB.

Figure 5:
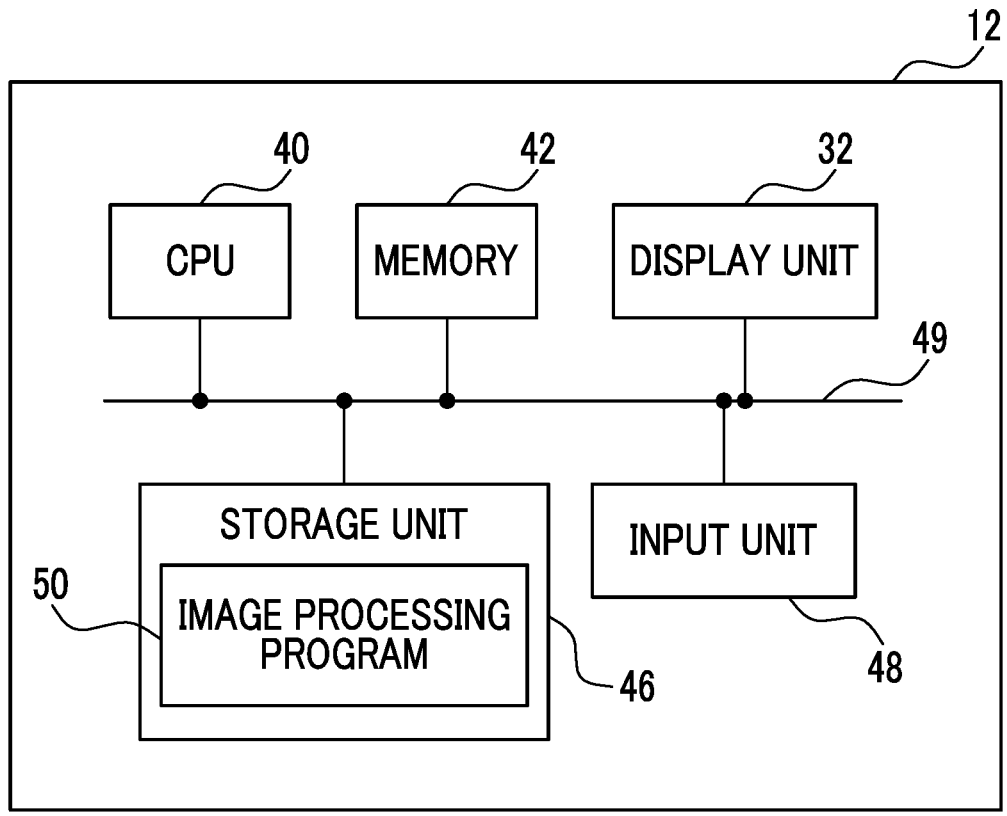
FIG. 5 is a diagram illustrating a hardware configuration of the image display device of the first embodiment.

Next, a hardware configuration of the image display device 12 will be described with reference to FIG. 5. As shown in FIG. 5, the image display device 12 has a computer comprising a central processing unit (CPU) 40, a memory 42 as a temporary storage area, and a nonvolatile storage unit 46. In addition, the image display device 12 comprises the display unit 32 described above and an input unit 48. The CPU 40, the memory 42, the storage unit 46, the input unit 48, and the display unit 32 are connected via a bus 49.

The storage unit 46 is realized by a hard disk drive (HDD), a solid state drive (SSD), a flash memory, and the like. An image processing program 50 is stored in the storage unit 46 as a storage medium. The CPU 40 reads the image processing program 50 from the storage unit 46, loads the read image processing program 50 in the memory 42, and then executes the image processing program 50. In a case where the CPU 40 executes the image processing program 50, the CPU 40 functions as the image generation unit 30 and the controller 31 shown in FIG. 4.

Image data of the input image, in other words, image data corresponding to the display image displayed on the display unit 32 is input to the input unit 48. The image data of the input image may be input from the outside of the image display device 12 or the image exposure device 10, or in a case where the image display device 12 or the image exposure device 10 itself has a function of forming or capturing an image, the image data formed or captured by itself may be input.

Support Portion

The support portion 21 of the present embodiment supports the photosensitive recording medium 14 in a state of being disposed at a position facing the surface irradiated with light from the image display device 12. The support portion 21 may directly or indirectly support the photosensitive recording medium 14, and the structure thereof is not particularly limited as long as the support portion 21 can support the photosensitive recording medium 14.

Photosensitive Recording Medium

As shown in FIG. 2, the photosensitive recording medium 14 of the present embodiment has an exposure surface 14A. The photosensitive recording medium 14 is not particularly limited as long as the photosensitive recording medium 14 can be exposed to light radiated from the image display device 12 and can form a recorded image. For example, it is possible to use a film pack 18 or the like to be attached to an instant camera (for example, manufactured by Fujifilm Corporation, Instax (registered trademark), (trade name: Cheki)).

The film pack 18 is formed by incorporating the photosensitive recording medium 14 into a case 20. A light shielding sheet (not shown) is provided between a plurality of the photosensitive recording mediums 14 provided in the case 20 and only the photosensitive recording medium 14 present on the uppermost surface of the film pack 18 is exposed by the light shielding sheet. In a case where the film pack 18 to be attached to the Instax (registered trademark) is applied, the photosensitive recording medium 14 and the light shielding sheet are incorporated in the film. As a material used for the photosensitive recording medium 14, for example, photographic light-sensitive materials such as a negative film, a reversal film, printing paper, and a mono-sheet or peel-apart type instant photographic film can be exemplified.

As shown in FIG. 2, a plurality of photosensitive recording medium 14 is packed in a box-like case 20 having light shielding properties. In the case 20, an exposure aperture 22 through which light radiated from the image display device 12 passes is provided in order to expose the exposure surface of the photosensitive recording medium 14. In addition, a pressing member (not shown) is provided on the side opposite to the exposure aperture 22, and the photosensitive recording medium 14 is pressed toward the exposure aperture 22 side by using the pressing member. Therefore, the photosensitive recording medium 14 is pressed against the periphery of the exposure aperture 22, the distance from the image display device 12 becomes close, and a favorable image can be recorded on the photosensitive recording medium 14.

As the case 20, a resin member for a recording material that is used for various recording materials such as a photographic light-sensitive material, a magnetic recording material, and an optical recording material can be used. The resin member for the recording material refers to a case, a lid, and an accessory supplemented thereto which are used to contain, pack, coat, protect, transport, or store the recording material, and support the form of the recording material or various members that mount the recording material and exhibit a function.

The photosensitive recording medium 14 after exposure passes through between developing rollers (not shown), whereby a pod portion provided in the photosensitive recording medium breaks. A development treatment liquid is encapsulated in the pod portion, and the breakage of the pod portion causes the development treatment liquid to spread in the photosensitive recording medium 14. After one to several minutes elapses, a development treatment is sufficiently advanced, and a recorded image is formed on the photosensitive recording medium 14.

Louver Film

Figure 6:
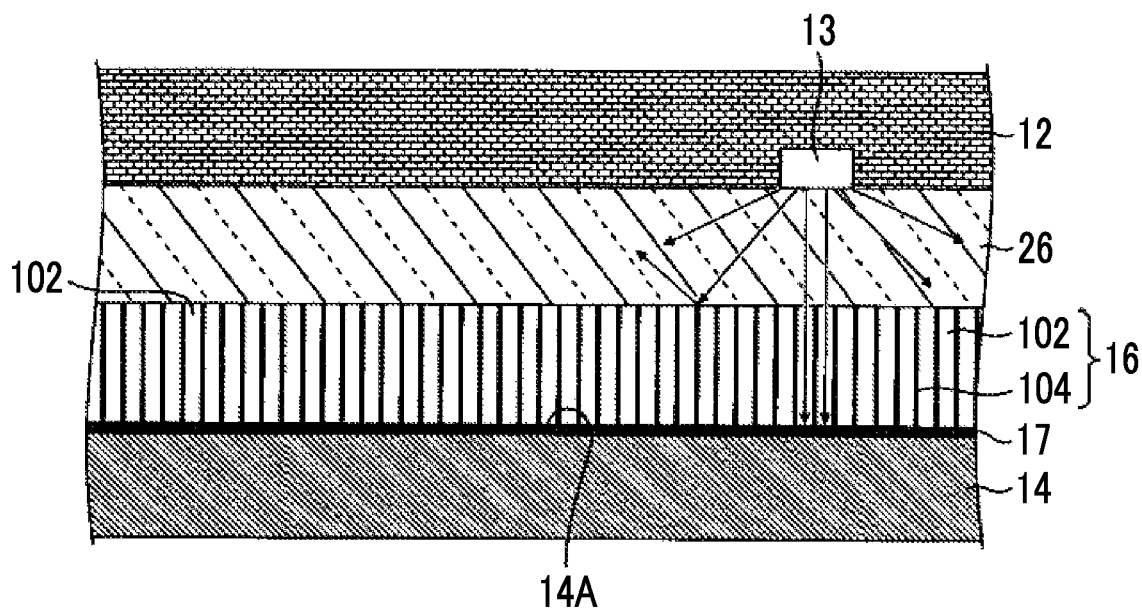
FIG. 6 is a schematic cross-sectional view for describing a traveling direction of light in the image exposure device of the first embodiment.
Figure 7:
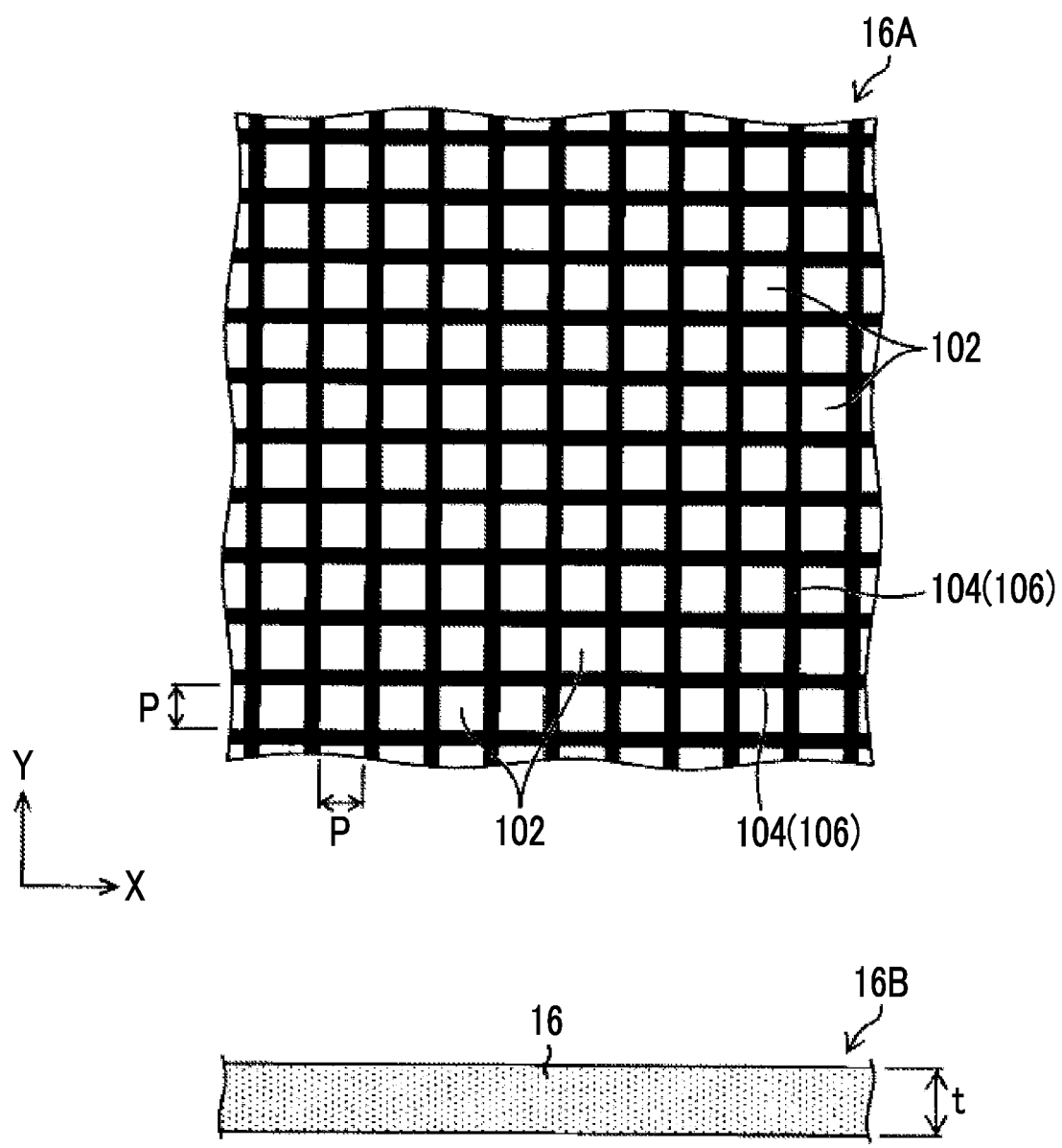
FIG. 7 is a diagram showing a configuration of an example of a louver film of the first embodiment.

An example of the louver film 16 of the present embodiment will be described with reference to FIGS. 6 and 7. FIG. 6 is a schematic cross-sectional view of an example of the image exposure device 10 of the present embodiment, and is a view for describing a traveling direction of light from the pixel 13. FIG. 7 is a diagram showing a configuration of an example of the louver film 16 of the present embodiment. A reference numeral 16A denotes a planar surface 16A of the louver film 16, and a reference numeral 16B denotes a side surface 16B of the louver film 16. In the louver film 16, light transmission parts 102 that transmit light and light shielding parts 104 that shield light are alternately disposed in the first direction (X direction in the planar surface 16A in FIG. 7) on a surface parallel to an arrangement surface where the pixels 13 of the image display device 12 are arranged. The light transmission parts 102 and the light shielding parts 104 disposed in the first direction of the present embodiment are examples of first light transmission parts and first light shielding parts of the present disclosure.

In addition, in the louver film 16, the light transmission parts 102 and the light shielding parts 104 are alternately disposed in the second direction (Y direction in the planar surface 16A in FIG. 7) perpendicular to the first direction on the surface parallel to the surface where the pixels of the image display device are arranged. The light transmission parts 102 and the light shielding parts 104 disposed in the second direction of the present embodiment are examples of second light transmission parts and second light shielding parts of the present disclosure.

In this way, in the present embodiment, the light transmission parts 102 are two-dimensionally disposed, and the light shielding parts 104 are formed in a lattice form. With such a configuration, as shown in FIG. 6, an angle of light radiated from the pixel 13 of the image display device 12 to the exposure surface 14A of the photosensitive recording medium 14 is limited. The louver film 16 of the present embodiment is an example of a limiting member of the present disclosure.

The light radiated from the pixel 13 of the image display device 12 is radiated in all directions of 180° from an image display surface. The radiated light passes through the glass window 26 provided in the image display device 12 and is incident on the louver film 16. In the light incident on the louver film 16, light parallel to a straight line connecting the image display device 12 and the photosensitive recording medium 14 passes through the light transmission parts 102 of the louver film 16. In addition, light radiated obliquely to the straight line connecting the image display device 12 and the photosensitive recording medium 14 is blocked by the light shielding parts 104 in the louver film 16. By limiting the angle of the light radiated from the image display device 12, the image quality of the recorded image recorded on the photosensitive recording medium 14 is improved.

The light transmission parts 102 only need to be able to pass through light, and can be provided using a glass material, a transparent silicone rubber, or the like. In addition, portions of the light transmission parts 102 can be provided as cavities, and the louver film 16 can be composed of only the light shielding parts 104. The light shielding parts 104 may be a light absorbing member that absorbs light, or a light reflecting member that reflects light. A light shielding member 106 constituting the light shielding parts 104 can use a colored resin material such as a black silicone rubber, for example. In addition, as the material that absorbs light, a neutral density filter (ND filter) can be used. The ND filter means a filter having a neutral optical density, and can absorb light evenly in a wavelength region used for exposure without giving an influence on the wavelength (absorbance of 50% or more to 99.999% or less; light transmittance of 0.001% or more to 50% or less).

Figure 8:
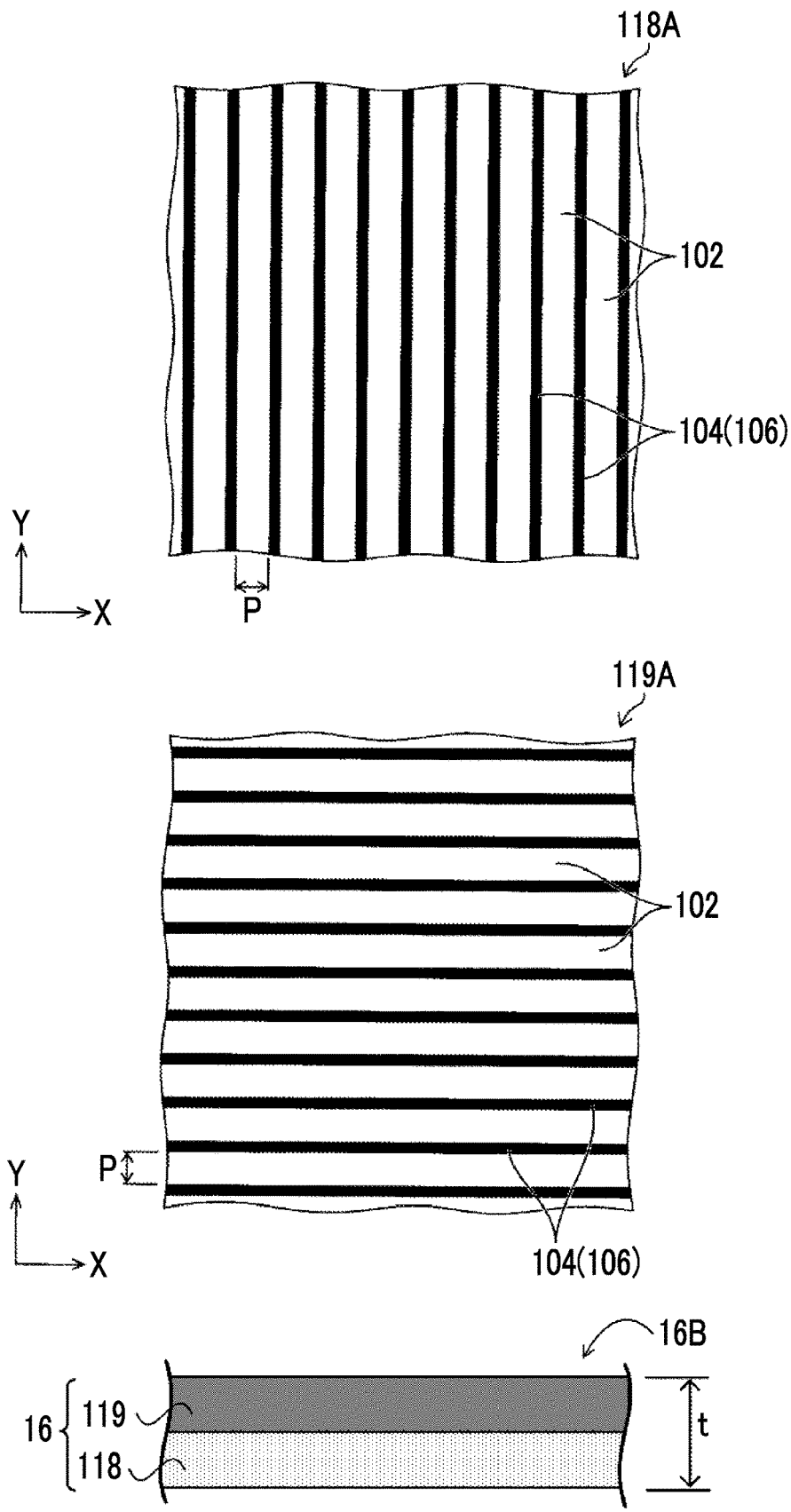
FIG. 8 is a diagram showing a configuration of another example of the louver film of the first embodiment.

The configuration of the louver film 16 is not limited to the present embodiment. FIG. 8 shows a configuration of another example of the louver film 16. The louver film 16 shown in FIG. 7 is formed of one layer as shown in the side surface 16B, and the light transmission parts 102 and the light shielding parts 104 are alternately disposed in the one layer in the first direction and the second direction. Thus, the louver film 16 with a two-dimensional arrangement is formed.

On the other hand, the louver film 16 shown in FIG. 8 is composed of two layers of the first layer 118 and the second layer 119. A reference numeral 16B denotes a side surface of the louver film 16, a reference numeral 118A denotes a planar surface of the first layer 118, and a reference numeral 119A denotes a planar surface of the second layer 119. As shown in the planar surface 118A of the first layer 118, in the first layer 118, the light transmission parts 102 and the light shielding parts 104 are alternately disposed only in the first direction (X direction in the planar surface 118A in FIG. 8). In the second layer 119, the light transmission parts 102 and the light shielding parts 104 are alternately disposed only in the second direction perpendicular to the first direction (Y direction in the planar surface 119A in FIG. 8). The first layer 118 and the second layer 119 are laminated to form a two-dimensional louver film 16. Thus, even in a case where the two-dimensional louver film 16 is formed with a plurality of layers, the same effect as that of the louver film 16 formed of one layer can be obtained.

Figure 9A:
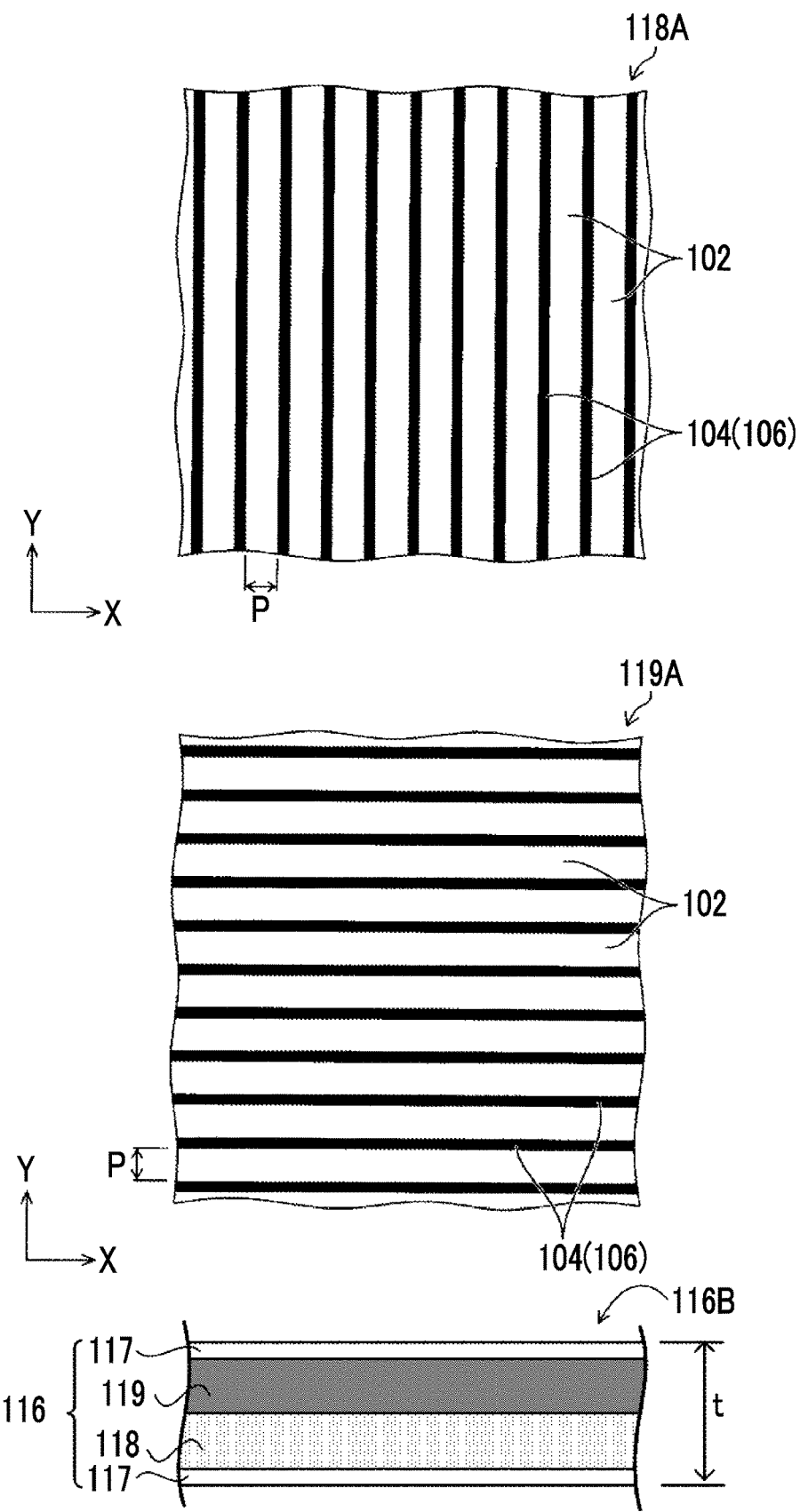
FIG. 9A is a diagram showing a configuration of another example of the louver film of the first embodiment.

Further, as shown in FIG. 9A, the louver film 16 may have a form in which a protective layer 117 for preventing the louver film 16 from being damaged or broken is provided on the surface thereof. Specifically, the louver film 16 may have a form in which a protective layer 117 is provided on each of the planar surface 118A of the first layer 118 on the side opposite to the side in contact with the second layer 119 and the planar surface 119A of the second layer 119 on the side opposite to the side in contact with the first layer 118. As shown in FIG. 9A, in a case where the protective layer 17 is provided on both sides of the louver film 16, it is possible to make the image defect generated based on the defect or the structure of the louver film 16 inconspicuous.

The protective layer 117 is not particularly limited as long as it is transparent and can transmit light. For the protective layer 117, for example, a plastic plate formed of an acrylic resin, a polycarbonate, a vinyl chloride resin, or the like can be used.

Figure 9B:
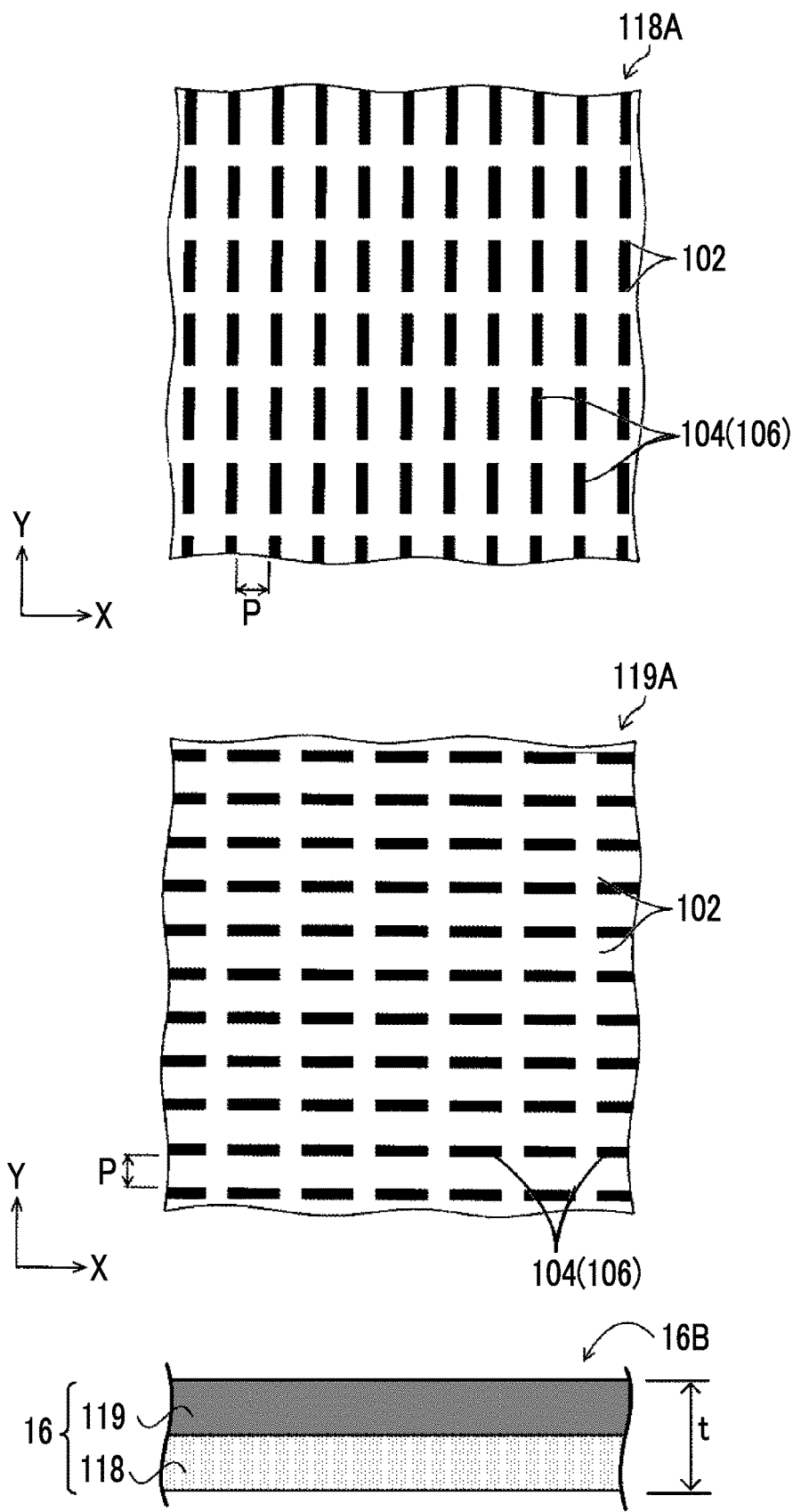
FIG. 9B is a diagram showing a configuration of another example of the louver film of the first embodiment.

Furthermore, as shown in FIG. 9B, at least one of the light shielding parts 104 in each column and each row may be composed of a plurality of light shielding members 106 having intervals. In the example shown in FIG. 9B, in the first layer 118, each column of light shielding parts 104 arranged along the first direction has a plurality of light shielding members 106 provided at predetermined intervals along the second direction. In the second layer 119, each row of light shielding parts 104 arranged along the second direction has a plurality of light shielding members 106 provided at predetermined intervals along the first direction.

A pitch P of the light shielding parts 104 of the louver film 16 is preferably 80 μm or less, and more preferably 65 μm or less. In a case where the pitch P of the light shielding parts 104 is set to be in the above-described range, it is possible to block obliquely radiated light in light radiated from the pixel 13, and to improve the image quality of the recorded image.

The light shielding parts 104 may be disposed with a difference in an angle between XY axes of the pixel as a reference for the arrangement of the pixel 13 and an angle between XY axes of the louver as the reference for the arrangement of the light transmission parts 102 and the light shielding parts 104 of the louver film 16. Moire of the recorded image is suppressed by disposing the pixel 13 with the difference in the angle between the XY axes of the pixel 13 and the XY axes of the louver. The difference of the angle is preferably 1 degree to 45 degrees, more preferably 5 degrees to 40 degrees, and even more preferably 10 degrees to 35 degrees.

A thickness t of the louver film 16 is preferably 1.5 mm or more and 4.0 mm or less, more preferably 2.0 mm or more and 4.0 mm or less, and still more preferably 2.5 mm or more and 4.0 mm or less. By increasing the thickness t of the louver film 16, oblique light at a small angle with respect to parallel light can be blocked. In addition, in a case where the thickness t of the louver film 16 is increased, the recorded image is likely to be blurred and thus, the thickness t of the louver film 16 is preferably in the above-described range. The thickness t of the louver film 16 is the thickness of one layer in a case where it is formed of one layer as in the louver film 16 shown in FIG. 7, and the total thickness of a plurality of layers is the thickness of the louver film 16 in a case where it is formed of the plurality of layers such as two layers of the first layer 118 and the second layer 119 as in the louver film 16 shown in FIGS. 8 and 9.

Protective Layer

The protective layer 17 is provided on the support portion 21 side of the louver film 16 as shown in FIGS. 1, 2, and 6. The protective layer 17 protects the louver film 16 in a case where the photosensitive recording medium 14 and the louver film 16 are in contact with each other during exposure. The protective layer 17 prevents the louver film 16 from being damaged or broken by repeated exposure of the display image displayed on the image display device 12 to the photosensitive recording medium 14.

The protective layer 17 is not particularly limited as long as it is transparent and can transmit light. For the protective layer 17, for example, a plastic plate formed of an acrylic resin, a polycarbonate, a vinyl chloride resin, or the like can be used.

The thickness of the protective layer 17 is preferably 0.1 μm or more and 500 μm or less. In a case where the thickness of the protective layer 17 is set to 0.1 μm or more, it is possible to make moire inconspicuous in addition to the effect of protecting the louver film 16. In addition, it is possible to make an image defect generated based on the defect or the structure of the louver film 16 inconspicuous. Further, in a case where the thickness of the protective layer 17 is set to 500 μm or less, the recorded image can be prevented from being blurred.

Operation of Controller 31

Next, an operation of the controller 31 of the image display device 12 of the present embodiment will be described.

The spectral characteristics of the light radiated from the image display device 12 to the photosensitive recording medium 14 may differ from the spectral sensitivity of the photosensitive recording medium 14, specifically, the spectral sensitivity (spectral characteristics) of the sensitive material of the photosensitive recording medium 14. In a case where the spectral characteristics of the image display device 12 and the photosensitive recording medium 14 are different from each other, the tint of the display image displayed on the image display device 12 may differ from the tint of the recorded image recorded on the photosensitive recording medium 14, that is, the tint of the recorded image exposed by the display image. For example, in the image display device 12, an image optimized for the spectral characteristics of the human eye is usually used as a display image. In this way, in a case where the photosensitive recording medium 14 is exposed to the display image optimized for the spectral characteristics of the human eye, the tint of the recorded image recorded on the photosensitive recording medium 14 may differ from the tint of the display image. For example, in a case where the photosensitive recording medium 14 is exposed to a display image having a strong green (G) color tint as the display image, a recorded image whose tint is biased toward the green (G) color can be obtained.

In a case where it is desired to make the tint of the recorded image recorded on the photosensitive recording medium 14 an image having a desired tint such as an image optimized for the spectral characteristics of the human eye, it is necessary to adjust the tint of the display image displayed on the image display device 12 in order to expose the photosensitive recording medium 14. Therefore, in a case where a recorded image whose tint is biased toward the green (G) color is obtained as described above, for example, the controller 31 of the present embodiment performs adjustment so that the amount of green (G) light in the display image (exposure image) displayed on the image display device 12 is reduced.

As an example of a method of adjusting the tint of the display image in the image display device 12 in order to make the tint of the recorded image recorded on the photosensitive recording medium 14 a desired tint, there is a method of changing a gradation assignment value of each color of RGB. The case where the display image has a strong green (G) color tint is the case where the exposure amount of green (G) is larger than the exposure amount of other colors in the exposure of the photosensitive recording medium 14. In a case where the gradation of the image display device 12 is 256 gradations, the controller 31 changes, for example, a gradation assignment value in which the pixel value for green (G) is 200 in the image data representing the input image to 150. That is, in a case where the pixel value for the green (G) color in the input image is "200", the controller 31 adjusts the pixel value to "150". By reducing the gradation assignment value, that is, the pixel value in the display image in this way, the exposure amount of green (G) is reduced, and it is possible to obtain a recorded image whose tint is not biased toward the green (G) color.

That is, by adjusting the gradation assignment value of the color having a strong tint to be small, in other words, by adjusting the pixel value of the color having a strong tint to be small, the exposure amount is reduced, so that it is possible to suppress the bias of the tint in the recorded image.

However, in the case of this adjustment method, originally, the gradation from 0 to 255 is assigned to the gradation less than 0 to 255. That is, it means that the number of gradations in the recorded image is less than 255 gradations. Therefore, so-called gradation skipping, tone jumps, and the like may occur in the recorded image.

Figure 10:
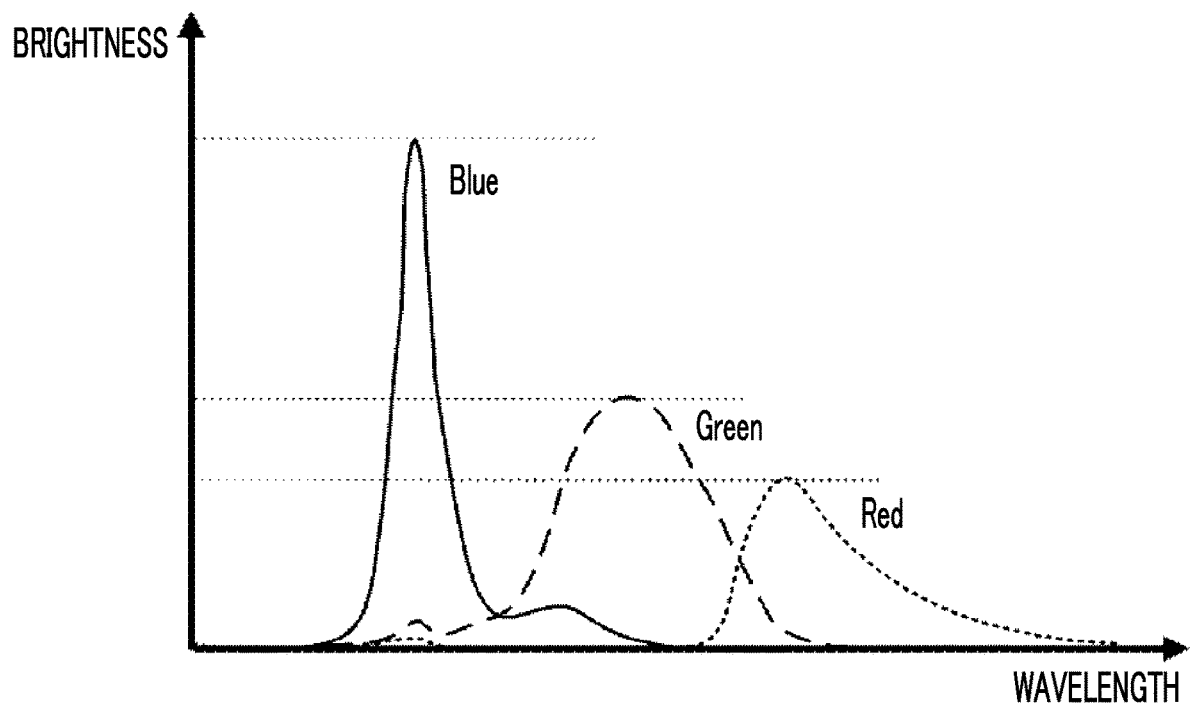
FIG. 10 is a graph showing an example of spectral characteristics of any image display device.
Figure 11:
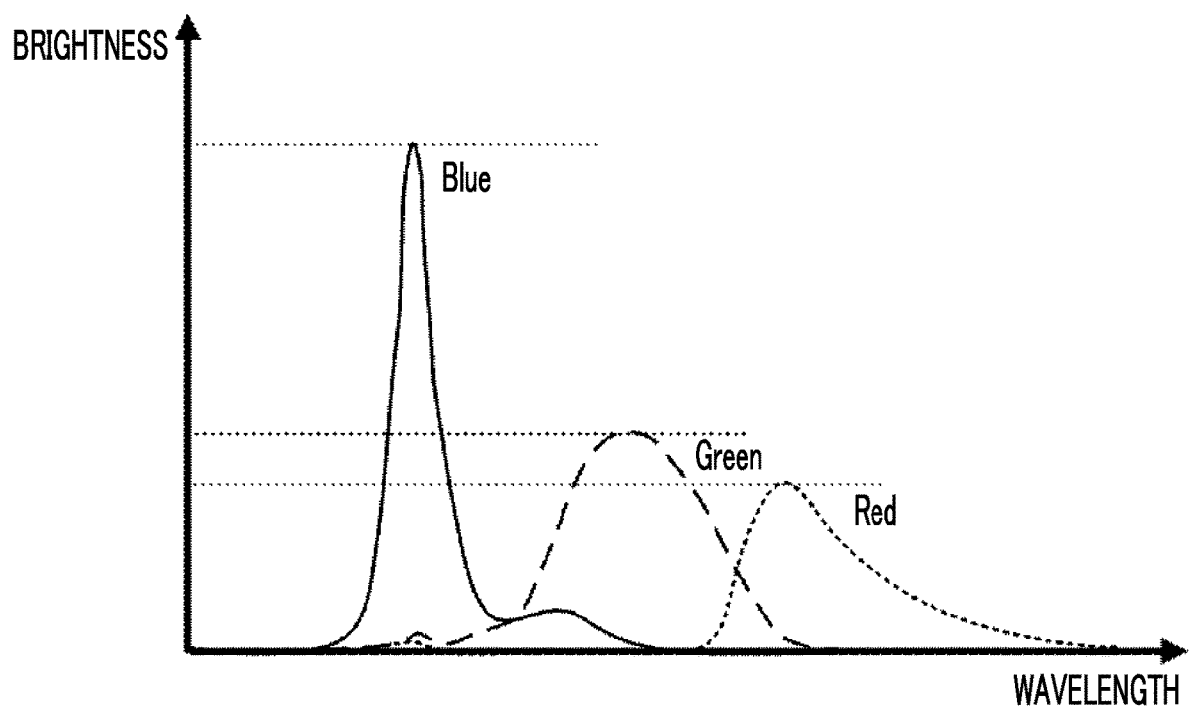
FIG. 11 is a graph showing an example of spectral characteristics of an image display device adjusted to optimize the tint of a recorded image recorded on any photosensitive recording medium.

A more specific description will be given with reference to FIGS. 10 and 11. FIG. 10 shows an example of the spectral characteristics of any image display device 12. On the other hand, FIG. 11 shows an example of spectral characteristics of the image display device 12 adjusted to optimize the tint of the recorded image recorded on any photosensitive recording medium 14. In the example shown in FIG. 11, as described above, since the tint of the green (G) color is strong in the recorded image, the case where the gradation assignment value of the green (G) color is adjusted is shown. As can be seen by comparing FIGS. 10 and 11, the ratio of the brightness of the green (G) color to the blue (B) color is different, and in the adjusted image display device 12 shown in FIG. 11, the ratio of the brightness of the green (G) color to the blue (B) color is small.

For each of the red (R) color, the green (G) color, and the blue (B) color in the spectral characteristics shown in FIG. 10, 256 gradations are assigned to the maximum values of 0 to brightness. In the adjusted spectral characteristics shown in FIG. 11, since the maximum value of the brightness of the green (G) color is smaller than that before the adjustment, the gradation value that can be used is smaller than 255. For example, in a case where the gradation assignment to the maximum value of the brightness of the green (G) color in the adjusted spectral characteristics shown in FIG. 11 is 230, in the adjusted image display device 12, the gradations of 231 to 255 cannot be used for the green (G) color.

As described above, in a case where the spectral characteristics of the image display device 12 and the spectral sensitivity of the photosensitive recording medium 14 are different from each other, the exposure amount of each of RGB in the display image for exposing the photosensitive recording medium 14 is not optimized, so that the number of gradations may decrease.

Therefore, the controller 31 of the present embodiment suppresses the decrease in the number of gradations as described above by optimizing the exposure amount of each of RGB in the display image for exposing the photosensitive recording medium 14. Specifically, the controller 31 optimizes the exposure amount of each of RGB by optimizing the exposure time of each of RGB in the display image, and sequentially displaying the image of the R component, the image of the G component, and the image of the B component on the image display device 12 in any order.

Exposure Time Optimization Method

Figure 12:
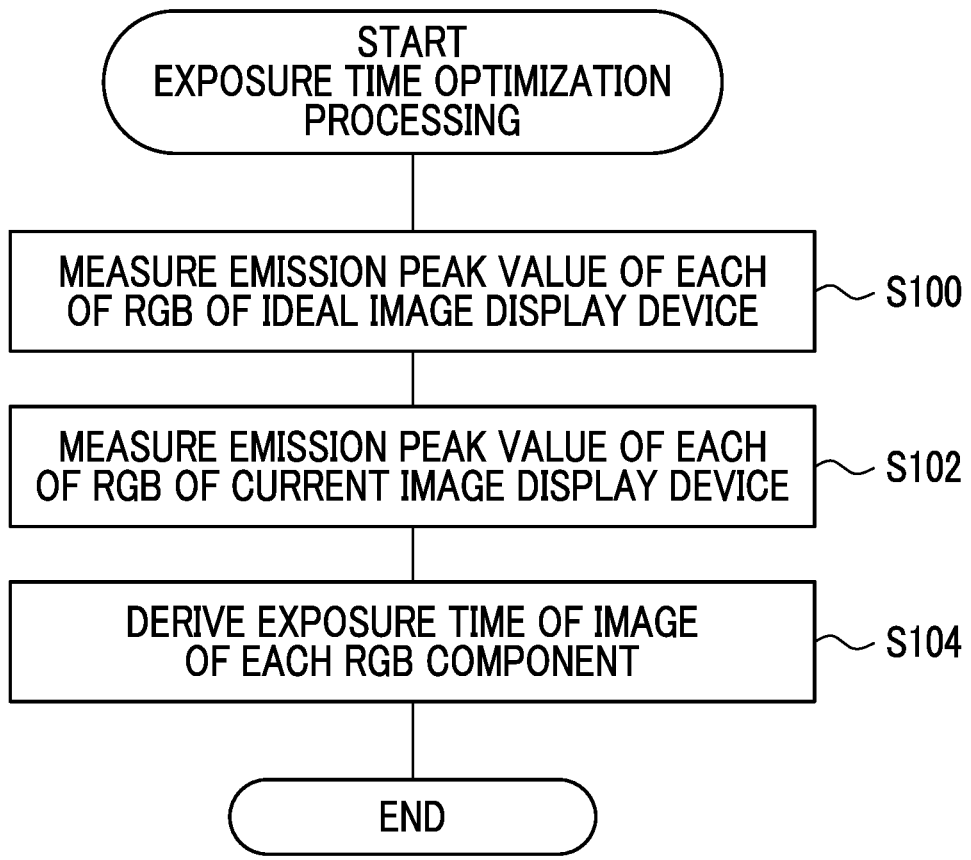
FIG. 12 is a flowchart showing an example of a processing flow for optimizing an exposure time.
Figure 13:
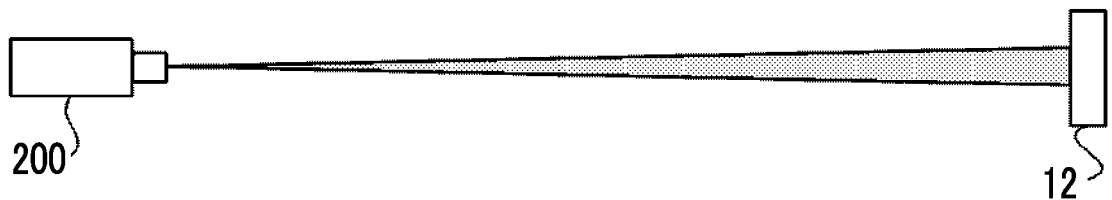
FIG. 13 is a diagram showing an example of an evaluation system for spectral characteristics (brightness) used in optimizing an exposure time.

FIG. 12 is a flowchart showing an example of a processing flow for optimizing an exposure time. Further, FIG. 13 shows an example of an evaluation system for spectral characteristics (brightness) used in optimizing an exposure time. In the evaluation system shown in FIG. 13, a spectroradiometer "SR-3" manufactured by Topcon Technohouse Co., Ltd. is used as a spectroradiometer 200, and the distance is 50 cm and the measurement angle is 2 degrees.

First, as a preprocessing step, in Step S100 shown in FIG. 12, an emission peak value of each of RGB of an ideal image display device is measured. An ideal image display device is an image display device that displays a display image that matches the tint of the recorded image recorded on the photosensitive recording medium 14. The image display device is the image display device 12 in a state where the display image is optimized.

Specifically, an image of the R component, that is, an image of red (R) color having a pixel value of (255,0,0) is displayed on an ideal image display device, and an emission peak value is measured by the evaluation system shown in FIG. 13. Similarly, an image of the G component, that is, an image of green (G) color having a pixel value of (0,255,0) is displayed on an ideal image display device, and an emission peak value is measured by the evaluation system shown in FIG. 13. In addition, similarly, an image of the B component, that is, an image of blue (B) color having a pixel value of (0,0,255) is displayed on an ideal image display device, and an emission peak value is measured by the evaluation system shown in FIG. 13. Thereby, the maximum value (maximum amount of light) of the optimum brightness in each of red (R), green (G), and blue (B) can be obtained.

Next, as a post-processing step, in Step S102 shown in FIG. 12, the emission peak value of each of RGB of the current image display device 12 before being incorporated into the image exposure device 10 is measured. As an example, in the present embodiment, the emission peak value of each of RGB in the image display device 12 before the louver film 16 is provided is measured. As for the measurement method, the image of the R component (255, 0,0), the image of the G component (0,255,0), and the image of the B component (0,0,255) are sequentially displayed on the image display device 12 in the same manner as in Step S100 described above, and the emission peak value in each image is measured by the spectroradiometer 200. Thereby, the maximum value of the optimum brightness in the current image exposure device 10 in each of red (R), green (G), and blue (B), that is, the maximum amount of light can be obtained.

As a post-processing step at the end of exposure time optimization processing, in Step S104 shown in FIG. 12, the exposure time of the image of each RGB component is derived. The total amount of light that hits the photosensitive recording medium 14 in exposure is the amount obtained by multiplying each amount of light for each of RGB and the exposure time (light amount×exposure time). As an example, in the present embodiment, the amount of light exposed for 100 msec at the maximum value of the brightness in the ideal image display device measured in Step S100 is defined as the total amount of light. That is, for each of RGB, the total amount of light for each of RGB is obtained by multiplying the maximum value (maximum amount of light) of the brightness measured in Step S100 by 100 msec. Next, for each of RGB, the optimum exposure time of each of RGB is obtained by dividing each total amount of light by the maximum value of the brightness in the current image display device 12 measured in Step S102, that is, the maximum amount of light (total amount of light÷maximum amount of light). As an example, in the present embodiment, the optimum exposure time for each of the RGB thus obtained is stored in advance in the storage unit 46 of the image display device 12.

The method of optimizing the exposure time for each of RGB is not limited to the above-mentioned method. For example, in a case where a white image (255, 255, 255) is displayed as a display image on the current image exposure device 10 and the photosensitive recording medium 14 is exposed by the present display image, the maximum value of the brightness of the display image for obtaining the optimum recorded image may be specified by adjusting the tint of the display image so that the recorded image is optimized.

Further, in the present embodiment, the color adjustment of each gradation was performed using a three-dimensional LookUp table (LUT) that refers to the combination of the output values of each of R, and B for the combination of the input values of each of R, and B.

Operation of Image Generation Unit 30

Next, an operation of the image generation unit 30 of the image display device 12 of the present embodiment will be described.

Figure 14:
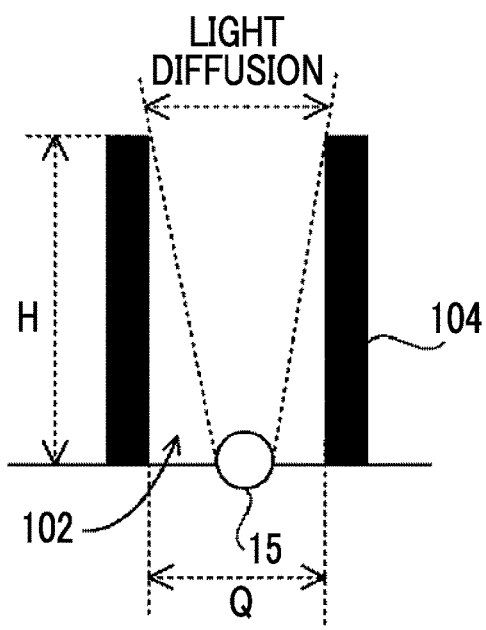
FIG. 14 is a diagram for describing the diffusion of light transmitted through the louver film.
Figure 15:
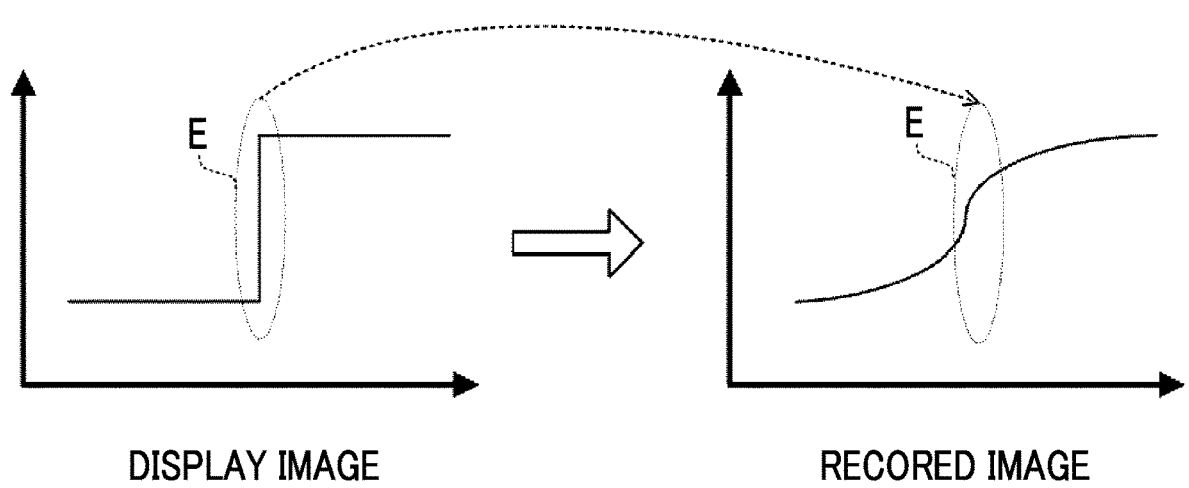
FIG. 15 is a diagram for describing a difference between a display image and a recorded image.

As described above, the angle of the light radiated from the image display device 12 is limited by the louver film 16, and the light parallel to the straight line connecting the image display device 12 and the photosensitive recording medium 14 passes through the light transmission parts 102 of the louver film 16. However, in actual fact, as shown in FIG. 14, light radiated from a point light source 15 of the display unit 32 is diffused. Specifically, according to the height H of the light shielding parts 104 and the width Q of the light transmission part 102, a light component having a predetermined angle is transmitted, that is, diffused. Due to the diffused light component, as shown in FIG. 15, in the recorded image recorded on the photosensitive recording medium 14, a density difference of a high-frequency component (edge portion) E is reduced as compared with the display image. That is, in the recorded image, since the density difference is small, the edge portion tends to be difficult to be visually recognized, and as a result, there is a high concern that the recorded image may become a blurred image.

As the thickness t of the louver film 16 increases, the amount of light reaching the photosensitive recording medium 14 from the image display device 12 decreases, so that there is a problem in that the exposure time is extremely long. In addition, as in the example shown in FIG. 8 or 9, in a case where the louver film 16 is formed of a plurality of layers, light is diffused in the directions not shielded by the light shielding parts 104 in each layer, and thus, blurring of the recorded image is likely to occur. Further, as the thickness of the protective layer 17 increases, the distance from the exposure surface 14A of the photosensitive recording medium 14 increases, and the angle of light is not limited in the protective layer 17, and thus, blurring of the recorded image is likely to occur.

Figure 16:
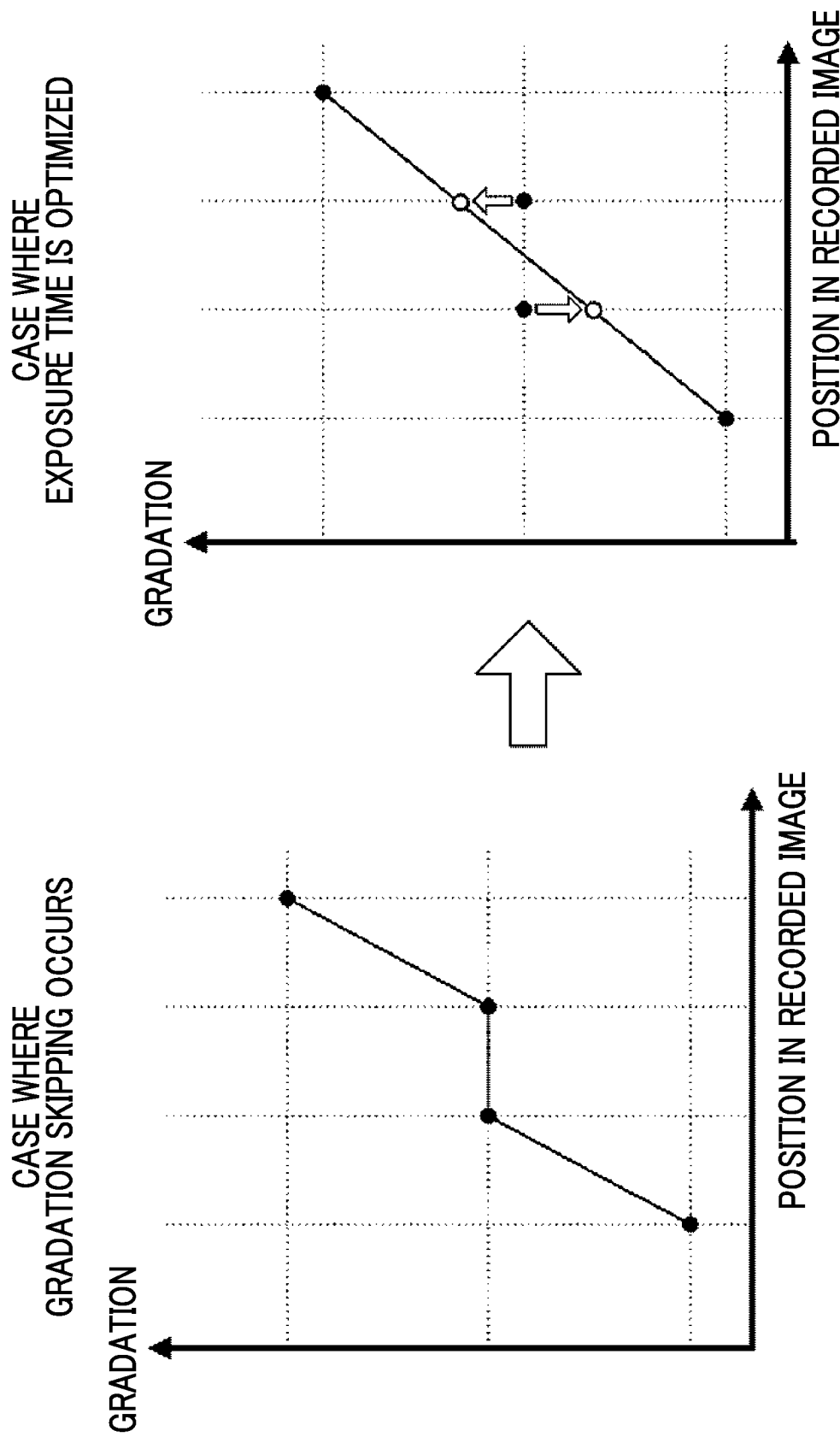
FIG. 16 is a diagram for describing blurring that occurs in a recorded image in a case where an exposure time is optimized.

Further, as described above, in the image exposure device 10 of the present embodiment, in a case where the controller 31 performs RGB sequential exposure at the optimized exposure time, the number of gradations of the display image does not decrease and the gradation skipping is reduced, so that the display image becomes a smooth image. However, by reducing the gradation skipping, the change in color shading is reduced, and as a result, the recorded image may become a blurred image. For example, as shown in FIG. 16, in a case where the exposure time is optimized as compared with the case where gradation skipping occurs as described above, the recorded image has more gradations indicated by white circles in the graph. However, as shown in FIG. 16, in the recorded image in which the exposure time is optimized, the image tends to be a blurred image with reduced visibility of the edge portion.

Therefore, in the present embodiment, the image generation unit 30 of the image display device 12 performs image processing to increase (emphasis) the high-frequency component (edge portion) of the display image in advance in consideration of the fact that the density difference is reduced in the recorded image rather than in the display image. In particular, the image generation unit 30 performs image processing for increasing (emphasizing) the high-frequency component (edge portion) of the display image in advance in consideration of the fact that the display image becomes the blurred image due to the optimization of the exposure time.

Image Processing

Figure 17:
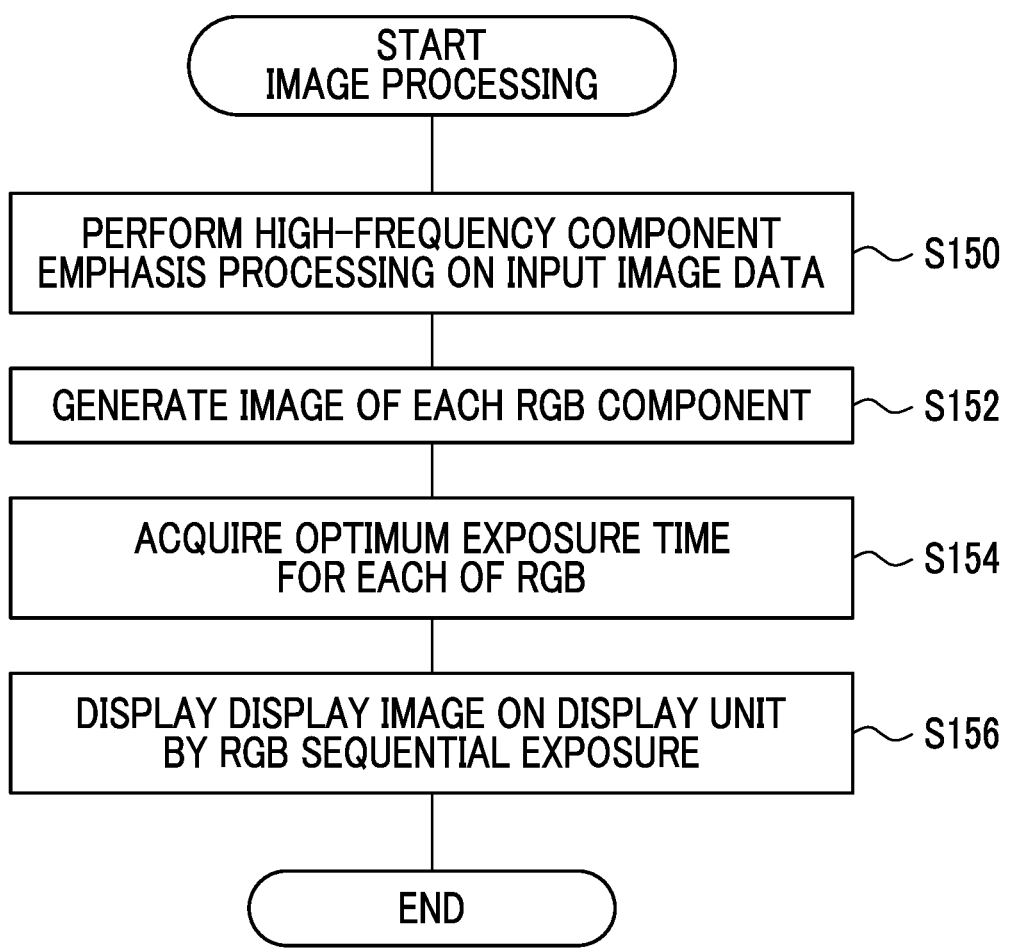
FIG. 17 is a flowchart of an example of image processing executed by the image display device of the first embodiment.

Next, image processing executed by the image display device 12 of the present embodiment will be described. FIG. 17 shows a flowchart of an example of image processing executed by the image display device 12 of the present embodiment. The image processing shown in FIG. 17 is executed in a case where the CPU 40 executes the image processing program 50.

In Step S150 shown in FIG. 17, the image generation unit 30 performs, on the input image data, high-frequency component emphasis processing for emphasizing the density difference of the high-frequency component of the input image. In the present embodiment, the image generation unit 30 performs unsharp masking as an example of the high-frequency component emphasis processing.

Specifically, first, an unsharp mask is generated. For the generation of the unsharp mask, for example, a two-dimensional Gaussian distribution is applied, in which $f(x, y)$ is a filter coefficient and the degree of distribution is a standard deviation $\sigma$, as shown in the following expression (1).

$$f(x, y) = \frac{1}{2\pi\sigma^2} e^{-\frac{x^2+y^2}{2\sigma^2}} \quad (1)$$

The standard deviation σ in the above expression (1) is a Gaussian distribution, that is, the radius of blurring of a blurred image, and is denoted by the number of pixels in the present embodiment.

Figure 18A:
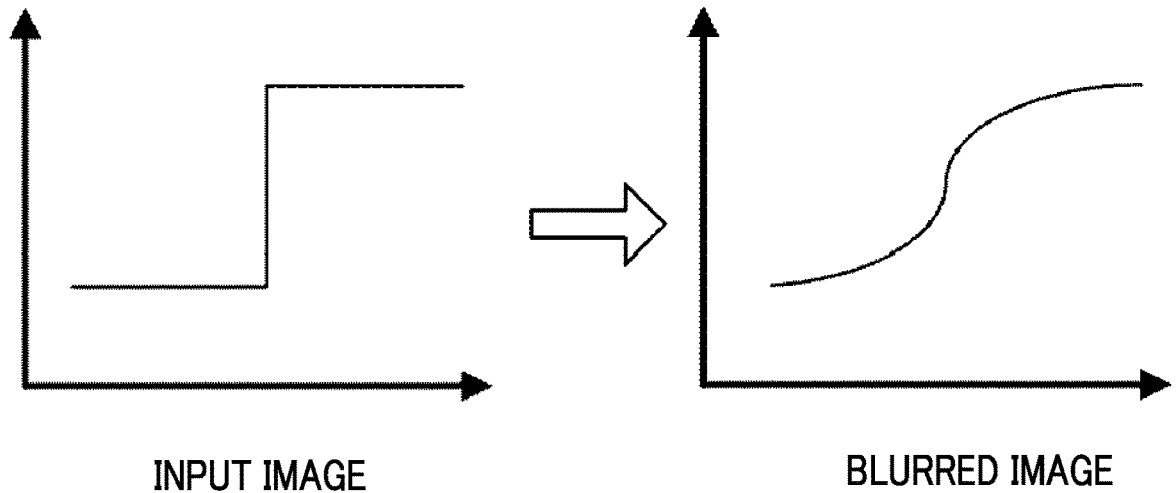
FIG. 18A is a diagram for describing an example of high-frequency component emphasis processing in the image processing shown in FIG. 17.

By multiplying the input image by the unsharp mask shown in the expression (1), the blurred image is generated from the input image as shown in FIG. 18A.

Figure 18B:
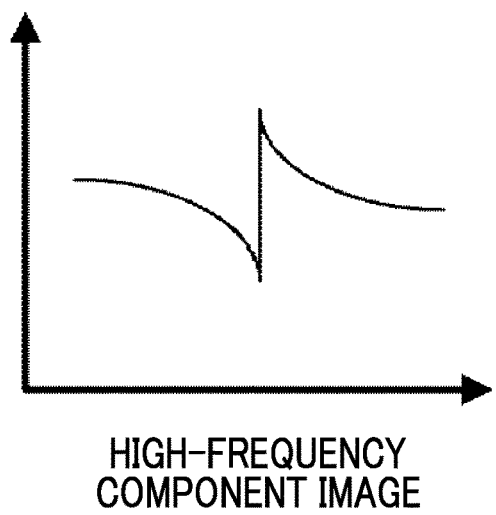
FIG. 18B is a diagram continued from FIG. 18A for describing an example of the high-frequency component emphasis processing in the image processing shown in FIG. 17.

Further, as shown in FIG. 18B, the image generation unit 30 generates a high-frequency component image from a difference between the input image and the blurred image. As shown in FIG. 18B, in the high-frequency component image, the difference becomes particularly large in the region where a gradation difference is large.

Figure 18C:
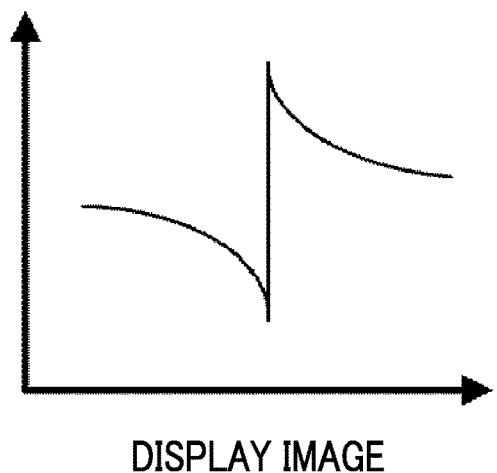
FIG. 18C is a diagram continued from FIG. 18B for describing an example of the high-frequency component emphasis processing in the image processing shown in FIG. 17.

Furthermore, as shown in FIG. 18C, the image generation unit 30 adds the high-frequency component image to the input image according to a weight W to generate a display image in which the high-frequency component is emphasized. That is, the display image is in a state in which the image quality is deteriorated as compared with the input image.

Figure 19:
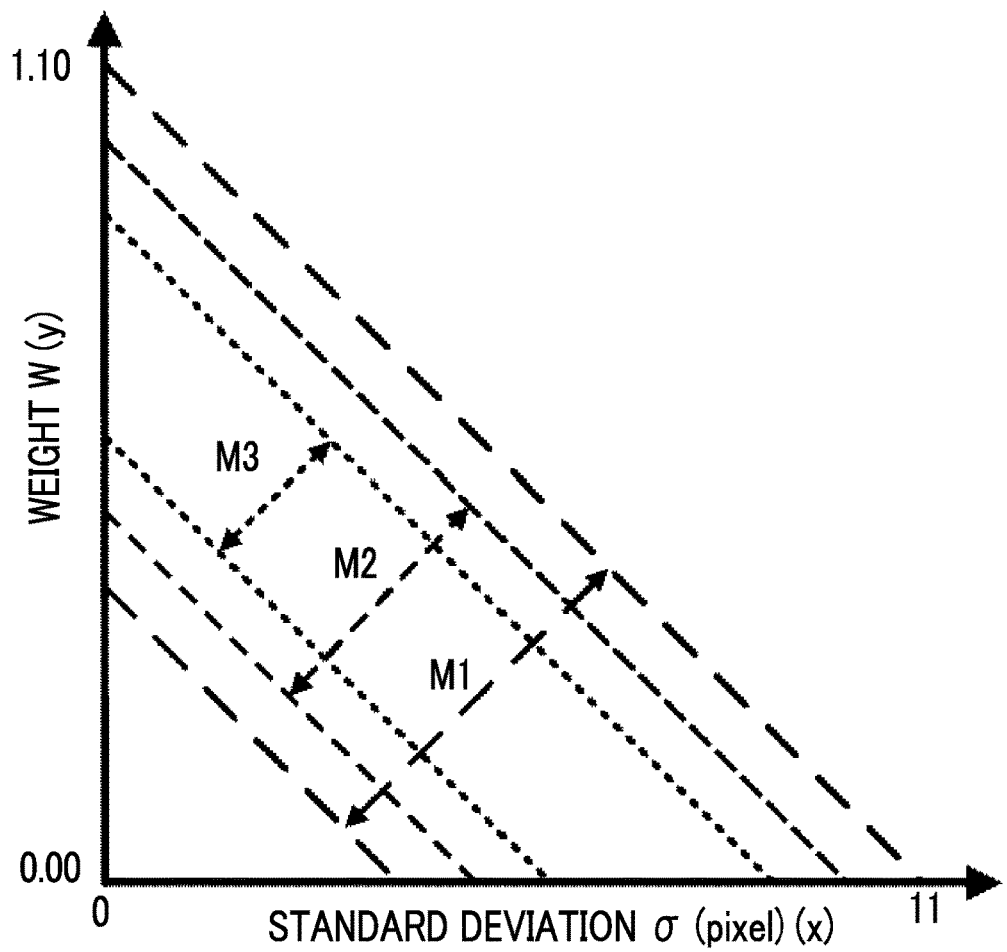
FIG. 19 is a graph for describing a preferable range of unsharp masking executed by a controller of the image display device of the first embodiment.

In a case where the resolution of the image display device 12 is 325 ppi (pixel per inch), in the unsharp masking to be applied to the input image, the range of the unsharp mask to be applied is preferably a range M1 represented by the following expression (2), more preferably a range M2 represented by the following expression (3), and still more preferably a range M3 represented by the following expression (4) in a case where the standard deviation σ is denoted by x and the weight W is denoted by y, as shown in FIG. 19.

$$-0.1 \times x + 0.40 < y < -0.1 \times x + 1.10 \quad (2)$$

$$-0.1 \times x + 0.50 < y < -0.1 \times x + 1.00 \quad (3)$$

$$-0.1 \times x + 0.60 < y < -0.1 \times x + 0.90 \quad (4)$$

In a case where the resolution of the image display device 12 is X ppi, an unsharp mask corresponding to a range obtained by multiplying the standard deviation σ of the above expressions (2) to (4) by the number obtained by dividing X by 325 may be applied. Specifically, an unsharp mask corresponding to the ranges M1 to M3 represented by each of the following expressions (5) to (7) may be applied.

$$-0.1 \times x \times (X \div 325) + 0.40 < y < -0.1 \times x \times (X \div 325) + 1.10 \quad (5)$$

$$-0.1 \times x \times (X \div 325) + 0.50 < y < -0.1 \times x \times (X \div 325) + 1.00 \quad (6)$$

$$-0.1 \times x \times (X \div 325) + 0.60 < y < -0.1 \times x \times (X \div 325) + 0.90 \quad (7)$$

In the next Step S152, the controller 31 generates an image of the R component, an image of the G component, and an image of the B component from the display image to which high-frequency component emphasis processing has been performed by the processing of Step S150. As an example, in the image processing using NumPy of the Python language, the controller 31 of the present embodiment separates the color channels of the display image to generate an image (single color image) of each RGB component. The method by which the controller 31 generates an image of each RGB component from the display image is not limited to this method, and a known technique can be applied.

Figure 20:
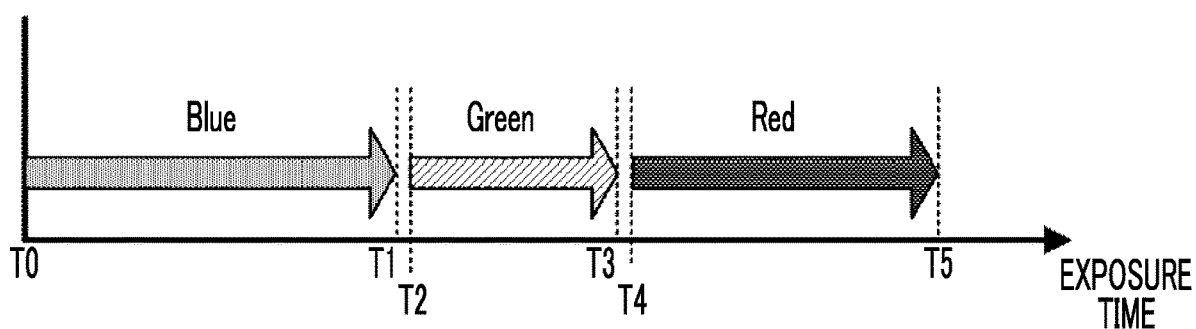
FIG. 20 is a time chart for describing an example of RGB sequential exposure.

In the next Step S154, the controller 31 acquires the optimum exposure time for each of RGB from the storage unit 46. In the next Step S156, as shown in FIG. 20, the controller 31 performs sequential exposure to display each of the image of the R component, the image of the G component, and the image of the B component according to the optimum exposure time such that the display image is displayed on the display unit 32. In the example shown in FIG. 20, the controller 31 displays (turns on) the image of the B component on the display unit 32 at an exposure start time T0, and hides (turns off) the image of the B component at a time T1. Specifically, the controller 31 turns on the sub-pixel 13B of the pixel 13 during the time T0 to T1 and exposes the photosensitive recording medium 14 with the B-color display image. Further, the controller 31 switches the image to be displayed on the display unit 32 from the image of the B component to the image of the G component during the period from the time T1 to a time T2, displays (turns on) the image of the G component on the display unit 32 at the time T2, and hides (turns off) the image of the G component at a time T3. Specifically, the controller 31 turns on the sub-pixel 13G of the pixel 13 during the time T2 to T3 and exposes the photosensitive recording medium 14 with the G-color display image. Further, the controller 31 switches the image to be displayed on the display unit 32 from the image of the G component to the image of the R component during the period from the time T3 to a time T4, displays (turns on) the image of the R component on the display unit 32 at the time T4, and hides (turns off) the image of the R component at a time T5. Specifically, the controller 31 turns on the sub-pixel 13R of the pixel 13 during the time T4 to T5 and exposes the photosensitive recording medium 14 with the R-color display image. In a case where the RGB sequential exposure by the controller 31 in Step S156 is terminated, the present image processing is ended, and a recorded image having an optimized tint is recorded on the photosensitive recording medium 14.

Effect Experiment of Image Exposure Device

Next, an experimental result performed on the effect of the image exposure device 10 of the present embodiment will be shown.

In the experiment, a general display having a resolution of 271 ppi was used as the image display device 12. In addition, the support portion 21 was a metal plate, and as the photosensitive recording medium 14, an Instax film was used. Further, as the louver film 16, the louver film in which the first layer 118, in which light transmission parts 102 having a thickness of 45 μm and light shielding parts 104 having a thickness of 15 μm were alternately disposed only in the first direction, and the second layer 119, in which light transmission parts 102 having a thickness of 45 μm and light shielding parts 104 having a thickness of 15 μm were alternately disposed only in the second direction perpendicular to the first direction, were laminated was used. The thickness of each layer of the louver film 16 was set to 1.15 mm (thickness t=2.3 mm). In addition, the thickness of the protective layer 17 on each surface was set to 0.2 and the louver film 16 was rotated by 30 deg with respect to a pixel disposition (XY axes) of the display unit 32.

As the display image, a general photographic image in which a landscape or a person was a subject was used. In addition, an image in which the high-frequency component was not emphasized (the edge portion is emphasized) was used as a comparison image for the recorded image of the present embodiment. Hereinafter, a recorded image to which a high-frequency emphasized image of the present embodiment is applied may be referred to as an "emphasized image" in order to distinguish the recorded image from the comparison image.

Figure 21:
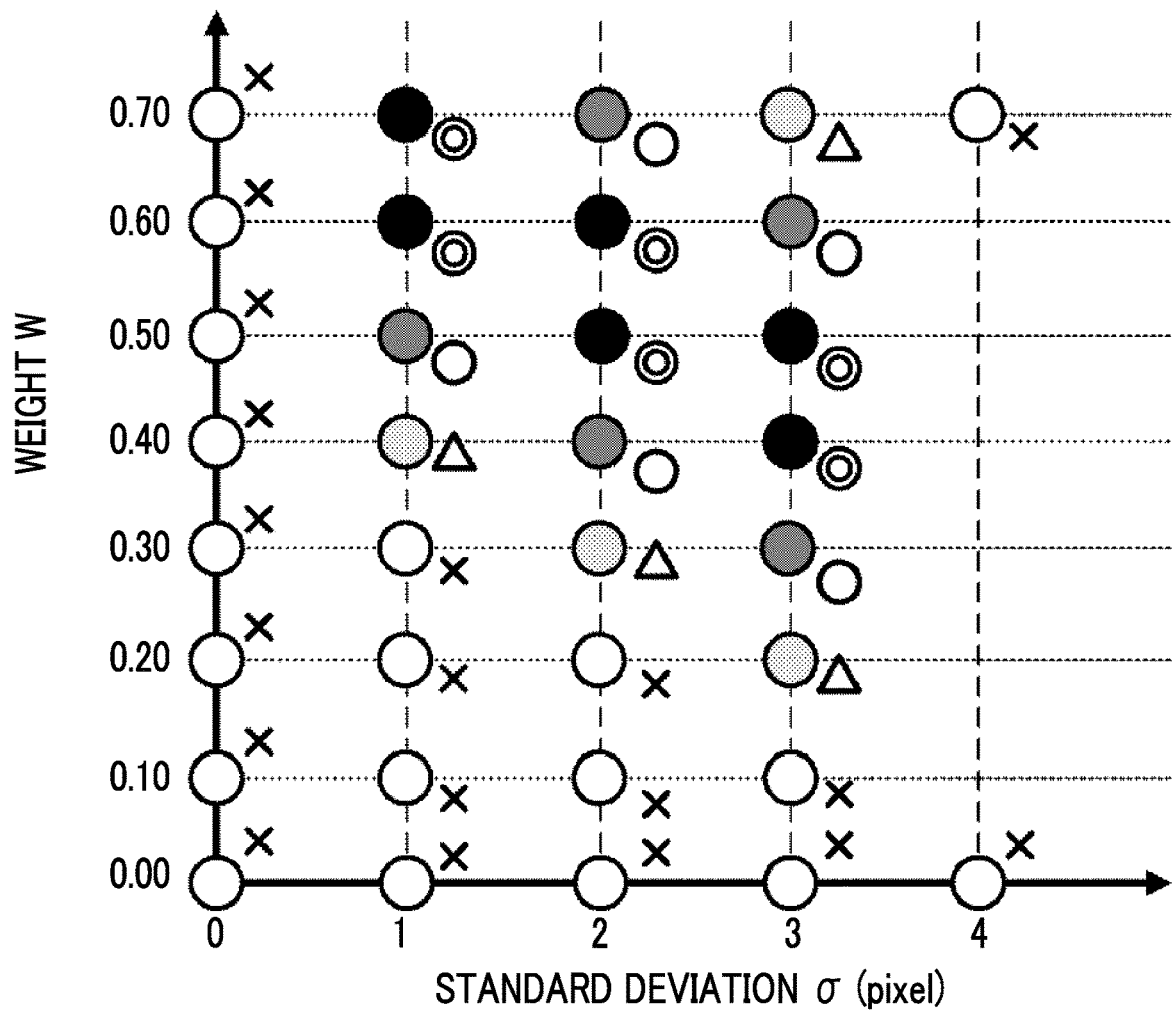
FIG. 21 is a graph showing an experimental result of a high-frequency component emphasis experiment.

Further, in the high-frequency component emphasis (edge emphasis) processing, the unsharp masking using the two-dimensional Gaussian distribution shown in (1) described above was performed by making the standard deviation σ and the weight W different as shown in FIG. 21. Further, the exposure time of the image of each RGB component in the RGB sequential exposure was set to the optimum exposure time obtained by the above-mentioned exposure time optimization method, and the image of the G component, the image of the R component, and the image of the B component were sequentially exposed in this order.

An evaluation method of an image quality was a sensory evaluation by an evaluation expert who has evaluated a sense of resolution of the photograph as to whether or not blurred feeling of the emphasized image is less than the comparison image, has good visibility, and is a preferable image.

FIG. 21 shows the evaluation result. In FIG. 21, the image quality was evaluated in four stages. In FIG. 21, "A" represents that the visibility is best, "B" represents that the visibility is good, "C" represents that the blurring of the image is improved, and "D" represents that the visibility is poor, in other words, the image is blurred.

Therefore, as shown in FIG. 21, and as described above, it can be seen that the range of the unsharp mask is preferably the range M1 represented by the above-described expression (2) where the standard deviation σ is denoted by x and the weight W is denoted by y, the range M2 represented by the above-described expression (3) is more preferable, and the range M3 represented by the above-described expression (4) is more preferable.

Second Embodiment

In the first embodiment, a method of performing RGB sequential exposure has been described as a method of exposing the photosensitive recording medium 14 by the image display device 12. In the present embodiment, as another method in which the image display device 12 exposes the photosensitive recording medium 14, a method in which the image display device 12 (image exposure device 10) can collectively expose the image of the R component, the image of the G component, and the image of the B component at the same time will be described.

Since the overall configuration of the image exposure device 10, and the configuration of the support portion 21, the photosensitive recording medium 14, and the louver film 16 are the same as those in the first embodiment, the description thereof will be omitted.

Image Display Device

In the present embodiment, the hardware configuration of the image display device 12 is the same as that of the first embodiment (see FIG. 5), but since the functional configuration thereof is different, the functional configuration and operation of the image display device 12 will be described.

Figure 22:
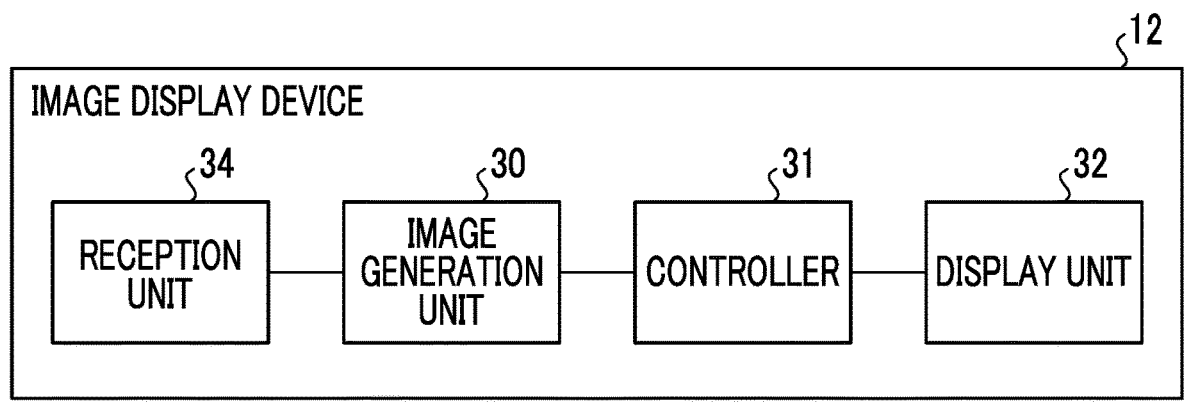
FIG. 22 is a block diagram showing an example of a functional configuration of an image display device of a second embodiment.

FIG. 22 is a block diagram showing an example of a functional configuration of the image display device 12 of the present embodiment. The image display device 12 of the present embodiment is different from the image display device 12 of the first embodiment (see FIG. 4) in that it further comprises a reception unit 34.

Figure 23:
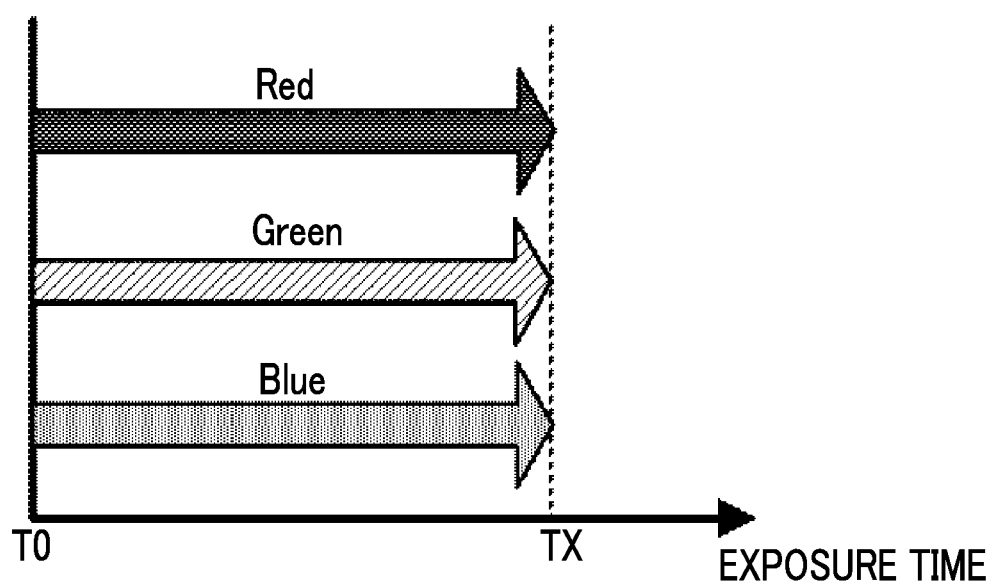
FIG. 23 is a time chart for describing an example of RGB batch exposure.

The image display device 12 of the present embodiment has two modes, as a mode for exposing the photosensitive recording medium 14, a sequential exposure mode in which RGB sequential exposure is performed, and as shown in FIG. 23, a batch exposure mode for performing batch exposure in which an image of an R component, an image of a G component, and an image of a B component are exposed at the same time.

In a case where the sequential exposure mode is performed, as described above, the tint of the recorded image recorded on the photosensitive recording medium 14 can be set to a desired tint, and it is possible to suppress the occurrence of gradation skipping in the recorded image recorded on the photosensitive recording medium 14. Therefore, in a case where the sequential exposure mode is performed, the image quality of the recorded image can be further improved.

On the other hand, in the batch exposure mode, as an example of a method of adjusting the tint of the display image in the image display device 12 in order to make the tint of the recorded image recorded on the photosensitive recording medium 14 a desired tint, the above-mentioned method of changing a gradation assignment value of each color of RGB is employed. Therefore, as described above, gradation skipping may occur in the recorded image recorded on the photosensitive recording medium 14. Therefore, the image quality of the recorded image may be lower than that in the case of performing RGB sequential exposure.

However, in the sequential exposure mode, since the image of the R component, the image of the G component, and the image of the B component are sequentially exposed, until the exposure of the images of all the RGB components is completed, in other words, the exposure time until the exposure of the photosensitive recording medium 14 is completed becomes long. On the other hand, in the RGB batch exposure, as shown in FIG. 23, since the image of the R component, the image of the G component, and the image of the B component are exposed at the same time, the exposure times overlap, and the time required to complete the exposure of the photosensitive recording medium 14 becomes shorter than that in the case of performing RGB sequential exposure. Therefore, in the case of performing RGB batch exposure, power consumption can be suppressed as compared with the case of performing RGB sequential exposure.

In other words, the sequential exposure mode is an image quality-oriented (high image quality) mode, and the batch exposure mode is an energy-saving mode that suppresses power consumption.

As an example, the reception unit 34 of the image display device 12 of the present embodiment receives an instruction given by the user as to whether to perform the sequential exposure mode or the batch exposure mode via an external interface (I/F) (not shown).

In a case where the reception unit 34 receives the instruction of the sequential exposure mode, the image generation unit 30 generates a display image to which the high-frequency component emphasis processing is performed as in the first embodiment. On the other hand, in a case where the reception unit 34 receives the instruction of the batch exposure mode, the image generation unit 30 generates a display image that has undergone high-frequency component emphasis processing in which the degree of emphasizing the density difference (edge) of high-frequency components is weaker than that of RGB sequential exposure. Even in the case of RGB batch exposure, as described above, the light radiated from the point light source 15 of the display unit 32 is diffused (see FIGS. 14 and 15), so that there is a concern that the image may be blurred. Therefore, the image generation unit 30 performs, on the input image data, high-frequency component emphasis processing for emphasizing the density difference of the high-frequency component of the input image.

On the other hand, as described above, in a case where RGB sequential exposure is performed by optimizing the exposure time, as a result of the light radiated from the point light source 15 of the display unit 32 being diffused, and gradation skipping being suppressed, the image tends to be a blurred image with reduced visibility of the edge portion. Therefore, in the RGB sequential exposure, the image generation unit 30 performs high-frequency component emphasis processing on the input image by further emphasizing the edge portion, that is, the density difference. In other words, in the case of RGB sequential exposure, the image generation unit 30 performs high-frequency component emphasis processing in which the density difference (edge) of the high-frequency component is emphasized more than in the RGB batch exposure.

In a case where the reception unit 34 receives the instruction of the sequential exposure mode, the controller 31 performs RGB sequential exposure and causes the photosensitive recording medium 14 to record the recorded image, as in the first embodiment. On the other hand, in a case where the reception unit 34 receives the instruction of the batch exposure mode, the controller 31 performs RGB batch exposure and causes the photosensitive recording medium 14 to record the recorded image, as shown in FIG. 23.

Image Processing

Figure 24:
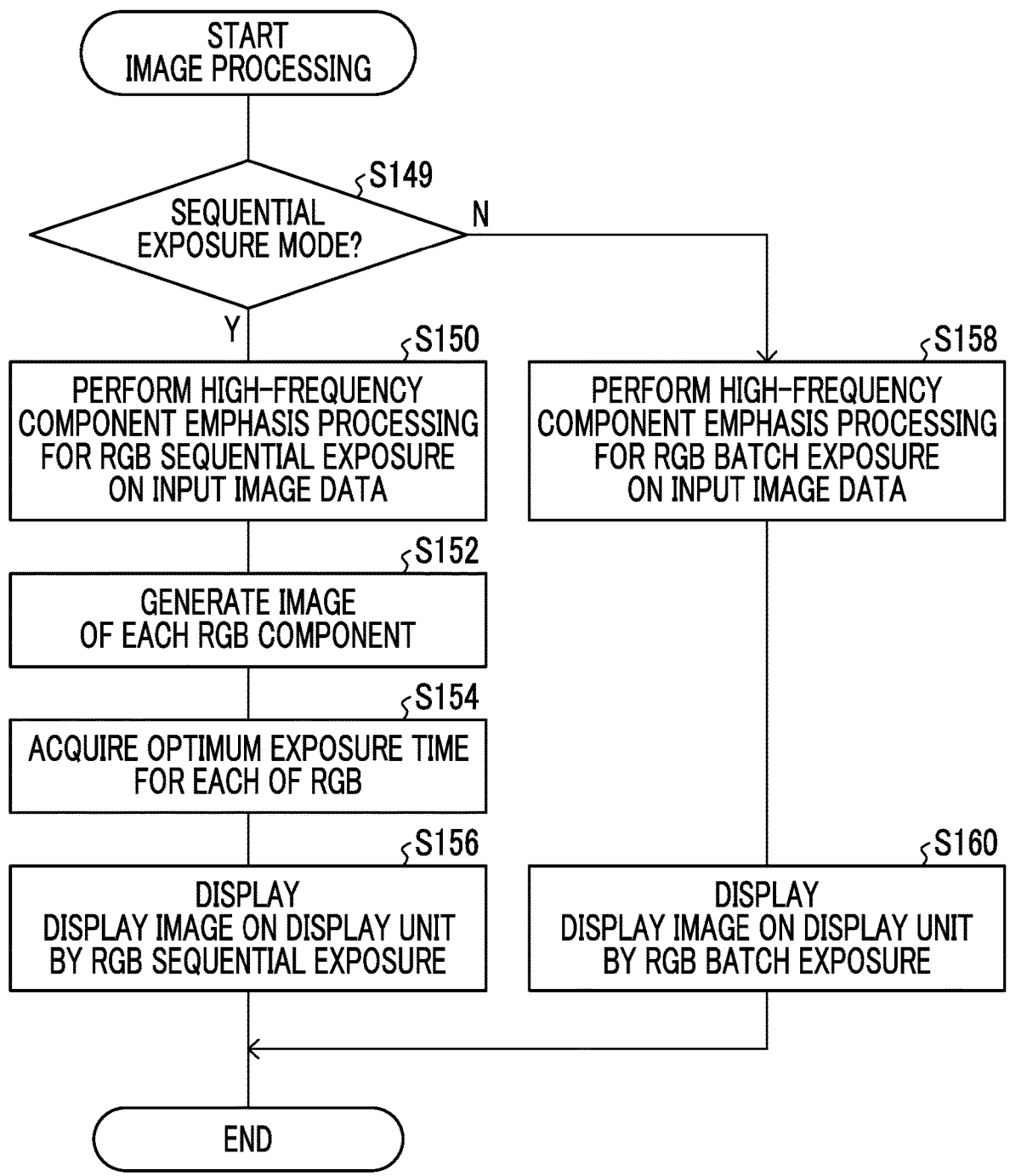
FIG. 24 is a flowchart of an example of image processing executed by the image display device of the second embodiment.

Next, image processing executed by the image display device 12 of the present embodiment will be described. FIG. 24 shows a flowchart of an example of image processing executed by the image display device 12 of the present embodiment. The image processing shown in FIG. 24 is different from the image processing of the first embodiment (see FIG. 17) in that the processing of steps S149, S158, and S160 is further provided.

In a case where the image processing shown in FIG. 24 starts, first, in Step S149, the reception unit 34 determines whether or not the instruction of the received mode is the sequential exposure mode. In a case where the instruction of the sequential exposure mode is received, the determination in Step S149 is a positive determination, and the processing proceeds to Step S150. On the other hand, in a case where the instruction of the received mode is not the sequential exposure mode, in other words, in a case where the instruction of the batch exposure mode is received, the determination in Step S149 is a negative determination, and the processing proceeds to Step S158.

In Step S158, the image generation unit 30 performs, on the input image data, high-frequency component emphasis processing for emphasizing the density difference of the high-frequency component of the input image. As an example, in the present embodiment, similarly to Step S150, the image generation unit 30 performs high-frequency component emphasis processing by performing unsharp masking using the unsharp mask generated by the above expression (1).

Figure 25:
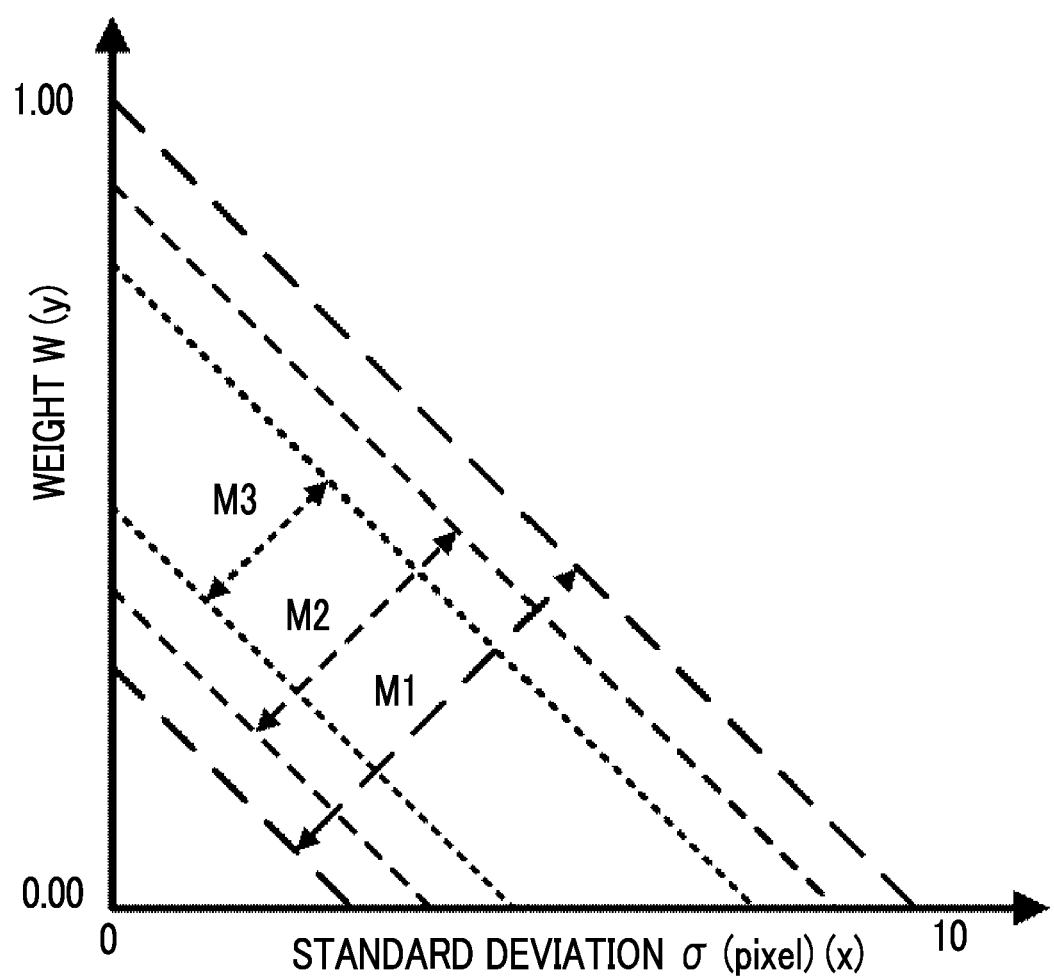
FIG. 25 is a graph for describing a preferable range of unsharp masking in a batch exposure mode, which is executed by a controller of the image display device of the second embodiment.

In a case where the resolution of the image display device 12 is 325 ppi (pixel per inch), in the unsharp masking to be applied to the input image, the range of the unsharp mask to be applied is preferably a range M1 represented by the following expression (8), more preferably a range M2 represented by the following expression (9), and still more preferably a range M3 represented by the following expression (10) in a case where the standard deviation σ is denoted by x and the weight W is denoted by y, as shown in FIG. 25.

$$-0.1 \times x+0.30 < y < -0.1 \times x+1.00 \tag{8}$$

$$-0.1 \times x+0.40 < y < -0.1 \times x+0.90 \tag{9}$$

$$-0.1 \times x+0.50 < y < -0.1 \times x+0.80 \tag{10}$$

In a case where the resolution of the image display device 12 is X ppi, an unsharp mask corresponding to a range obtained by multiplying the standard deviation σ of the above expressions (8) to (10) by the number obtained by dividing X by 325 may be applied. Specifically, an unsharp mask corresponding to the ranges M1 to M3 represented by each of the following expressions (11) to (13) may be applied.

$$-0.1 \times x \times (X \div 325)+0.30 < y < -0.1 \times x \times (X \div 325)+1.00 \tag{11}$$

$$-0.1 \times x \times (X \div 325)+0.40 < y < -0.1 \times x \times (X \div 325)+0.90 \tag{12}$$

$$-0.1 \times x \times (X \div 325)+0.50 < y < -0.1 \times x \times (X \div 325)+0.80 \tag{13}$$

In the next Step S160, the controller 31 causes the display unit 32 to display the display image to which the high-frequency component emphasis processing has been performed by the processing of the above Step S158 by RGB batch exposure. Specifically, as shown in FIG. 23, the controller 31 displays (turns on) the image of the R component, the image of the G component, and the image of the B component on the display unit 32 all at once at an exposure start time T0, and hides (turns off) the image of the R component, the image of the G component, and the image of the B component all at once at a time TX at which the predetermined exposure time is reached. In a case where the photosensitive recording medium 14 is exposed and the recorded image is recorded, the process of Step S160 is terminated, and the present image processing is ended.

As described above, the image exposure device 10 of each of the above embodiments comprises an image display device 12 having a plurality of pixels 13, a support portion 21 that supports a photosensitive recording medium 14 for recording an image displayed on the image display device 12 in a state in which an exposure surface 14A of the photosensitive recording medium 14 faces the image display device 12, and a louver film 16 that is provided between the image display device 12 and the support portion 21 and limits an angle of light radiated from the image display device 12 to the photosensitive recording medium 14. Further, the image exposure device 10 comprises an image generation unit 30 that generates a display image in which an image quality of a color input image represented by input image data is deteriorated by emphasizing a density difference of a high-frequency component of the input image, and a controller 31 that performs a control for generating an image of an R component, an image of a G component, and an image of a B component from the display image and sequentially displaying each of the image of the R component, the image of the G component, and the image of the B component on the image display device 12 in a predetermined order to sequentially expose the photosensitive recording medium 14.

As described above, the controller 31 of the image display device 12 in the image exposure device 10 of each of the above embodiments sequentially displays each of the image of the R component, the image of the G component, and the image of the B component on the image display device 12 in a predetermined order to sequentially expose the photosensitive recording medium 14. Thereby, the exposure time of each of the image of the R component, the image of the G component, and the image of the B component can be optimized, and the gradation skipping of the recorded image recorded on the photosensitive recording medium 14 can be suppressed. Further, the image generation unit 30 of the image display device 12 of each of the above embodiments generates a display image to be used for the exposure of the photosensitive recording medium 14 by emphasizing a density difference of a high-frequency component of a color input image represented by input image data as an image in which the image quality of the input image is deteriorated. The recorded image recorded on the photosensitive recording medium 14 becomes a blurred image than the display image due to the diffusion of the light transmitted through the louver film 16, but the image has the same image quality as the input image. That is, according to the image exposure device 10 of the present embodiment, even in a case where the image quality of the display image is deteriorated, the image quality of the recorded image is the same as the image quality of the input image.

Therefore, according to the image exposure device 10 of each of the above embodiments, it is possible to suppress blurring of the recorded image and suppress gradation skipping.

In each of the above embodiments, a mode in which each of the plurality of pixels 13 of the image display device 12 comprises sub-pixels 13R, 13G and 13B to display a color image on the image display device 12 has been described, but the configuration of the image display device 12 for displaying the color image is not limited to this mode. For example, the image display device 12 may be provided with a light source or a filter corresponding to each of the R component, the G component, and the B component.

In each of the above embodiments, the aspect in which the unsharp masking is performed as the high-frequency component emphasis processing performed by the image generation unit 30 has been described, but the present disclosure is not limited to the present embodiment, and for example, convolution processing or the like may be applied.

For example, the structure of the louver film 16 is also not limited, and further, it is not limited as long as it is a limiting member capable of limiting the angle of the light radiated from the image display device 12. For example, the light transmission parts 102 and the light shielding parts 104 may be disposed aperiodically, and a capillary plate or the like in which holes are randomly formed may be used as the limiting member.

In addition, in each of the above embodiments, the aspect in which the image display device 12 comprises the image generation unit 30 and the controller 31 has been described, but each of the image generation unit 30 and the controller 31 may be configured as a device different from the image display device 12. For example, a CPU such as a smartphone may execute the image processing program 50 to perform image processing by functioning as the image generation unit 30 and the controller 31 and the image display device 12 may receive the image data subjected to the image processing from the smartphone and display a display image corresponding to the image data on the display unit 32. Further, the image generation unit 30 and the controller 31 may be provided in different devices.

Further, as hardware structures of processing units that execute various kinds of processing such as each functional unit of the image display device 12 in each of the above embodiments, various processors shown below can be used. As described above, the various processors include a programmable logic device (PLD) as a processor of which the circuit configuration can be changed after manufacture, such as a field programmable gate array (FPGA), a dedicated electrical circuit as a processor having a dedicated circuit configuration for executing specific processing such as an application specific integrated circuit (ASIC), and the like, in addition to the CPU as a general-purpose processor that functions as various processing units by executing software (program).

One processing unit may be configured by one of the various processors, or configured by a combination of the same or different kinds of two or more processors (for example, a combination of a plurality of FPGAs or a combination of the CPU and the FPGA). In addition, a plurality of processing units may be configured by one processor.

As an example where a plurality of processing units are configured by one processor, first, there is a form in which one processor is configured by a combination of one or more CPUs and software as typified by a computer, such as a client or a server, and this processor functions as a plurality of processing units. Second, as represented by a system on chip (SoC) or the like, there is a form of using a processor for realizing the function of the entire system including a plurality of processing units with one integrated circuit (IC) chip. In this way, various processing units are configured by one or more of the above-described various processors as hardware structures.

Furthermore, as the hardware structure of the various processors, more specifically, an electrical circuit (circuitry) in which circuit elements such as semiconductor elements are combined can be used.

In the above embodiment, the image processing program 50 is described as being stored (installed) in the storage unit 46 in advance; however, the present disclosure is not limited thereto. The image processing program 50 may be provided in a form recorded in a recording medium such as a compact disc read only memory (CD-ROM), a digital versatile disc read only memory (DVD-ROM), and a universal serial bus (USB) memory. In addition, the image processing program 50 may be downloaded from an external device via a network.

The disclosure of Japanese Patent Application No. 2019-177694 filed Sep. 27, 2019 is incorporated herein by reference in its entirety.

All literatures, patent applications, and technical standards described herein are incorporated by reference to the same extent as if the individual literature, patent applications, and technical standards were specifically and individually stated to be incorporated by reference.

What is claimed is:

1. An image exposure device comprising:
   an image display device having a plurality of pixels;
   a support portion that supports a photosensitive recording medium for recording an image displayed on the image display device in a state in which an exposure surface of the photosensitive recording medium faces the image display device;
   a limiting member that is provided between the image display device and the support portion and limits an angle of light radiated from the image display device to the photosensitive recording medium;
   an image generation unit that generates a display image in which an image quality of a color input image represented by input image data is deteriorated by emphasizing a density difference of a high-frequency component of the input image; and a controller that performs a control for generating an image of an R component, an image of a G component, and an image of a B component from the display image and sequentially displaying each of the image of the R component, the image of the G component, and the image of the B component on the image display device in a predetermined order to sequentially expose the photosensitive recording medium, wherein the image generating unit generates a blurred image by applying an unsharp masking to the input image, generates a high-frequency component image representing a difference between the input image and the blurred image, and generates the display image by adding the high-frequency component image to the input image.

2. The image exposure device according to claim 1, wherein a total amount of light for exposing the photosensitive recording medium is determined for each color of RGB, and the controller performs a control such that the photosensitive recording medium is sequentially exposed by each of the image of the R component, the image of the G component, and the image of the B component at an exposure time corresponding to a maximum amount of light of each color of RGB displayed on the image display device and the total amount of light.

3. The image exposure device according to claim 2, wherein the total amount of light is determined based on spectral characteristics of the light radiated from the image display device and a spectral sensitivity of the photosensitive recording medium.

4. The image exposure device according to claim 1, wherein each of the plurality of pixels includes a sub-pixel corresponding to each of RGB.

5. The image exposure device according to claim 1, wherein the limiting member is an optical member of a diffusion optical system.

6. The image exposure device according to claim 5, wherein the optical member is a louver film in which first light transmission parts that transmit light and first light shielding parts that shield light are alternately disposed in a first direction on a surface parallel to an arrangement surface where the pixels of the image display device are arranged, and second light transmission parts that transmit light and second light shielding parts that shield light are alternately disposed in a second direction on the surface, the second direction being not parallel to the first direction.

7. The image exposure device according to claim 5, wherein the optical member is a louver film in which first light transmission parts that transmit light and first light shielding parts that shield light are alternately disposed in a first direction on a surface parallel to an arrangement surface where the pixels of the image display device are arranged, and second light transmission parts that transmit light and second light shielding parts that shield light are alternately disposed in a second direction on the surface, the second direction being perpendicular to the first direction.

8. The image exposure device according to claim 6, wherein the louver film is formed by laminating a first layer in which the first light transmission parts and the first light shielding parts are alternately disposed only in the first direction, and a second layer in which the second light transmission parts and the second light shielding parts are alternately disposed only in the second direction.

9. The image exposure device according to claim 8, wherein the first light shielding parts of the first layer include a plurality of first light shielding members disposed at predetermined intervals along the second direction, and the second light shielding parts of the second layer include a plurality of second light shielding members disposed at predetermined intervals along the first direction.

10. The image exposure device according to claim 1, wherein in a case where a weight of the unsharp masking is denoted by y and a standard deviation of a degree of a two-dimensional Gaussian distribution used for the unsharp masking is denoted by x, the following expression (1) is satisfied, $$-0.1 \times x + 0.50 < y < -0.1 \times x + 1.00 \qquad (1).$$

11. The image exposure device according to claim 1, wherein in a case where a weight of the unsharp masking is denoted by y, a standard deviation of a degree of a two-dimensional Gaussian distribution used for the unsharp masking is denoted by x, and a resolution of the image display device is denoted by X pixel per inch (ppi), the following expression (2) is satisfied, $$-0.1 \times x \times (X+325) + 0.50 < y < -0.1 \times x \times (X+325) + 1.00 \qquad (2).$$

12. The image exposure device according to claim 1, further comprising:

a reception unit that receives an instruction on whether to perform batch exposure or the sequential exposure for the exposure of the photosensitive recording medium, the batch exposure exposing the photosensitive recording medium by collectively displaying the image of the R component, the image of the G component, and the image of the B component of the display image on the image display device, wherein the controller performs a control such that the photosensitive recording medium is collectively exposed in a case where the reception unit receives an instruction for performing the batch exposure, and performs a control such that the photosensitive recording medium is sequentially exposed in a case where the reception unit receives an instruction for performing the sequential exposure.

13. The image exposure device according to claim 12, wherein in a case where the sequential exposure is performed, the image generation unit generates the display image in which the density difference of the high-frequency component is more emphasized than in a case where the batch exposure is performed.

14. An image exposure method in an image exposure device including an image display device having a plurality of pixels, a support portion that supports a photosensitive recording medium for recording an image displayed on the image display device in a state in which an exposure surface of the photosensitive recording medium faces the image display device, and a limiting member that is provided between the image display device and the support portion and limits an angle of light radiated from the image display device to the photosensitive recording medium, the method comprising:

generating a display image in which an image quality of a color input image represented by input image data is deteriorated by emphasizing a density difference of a high-frequency component of the input image; and performing a control for generating an image of an R component, an image of a G component, and an image of a B component from the display image and sequentially displaying each of the image of the R component, the image of the G component, and the image of the B component on the image display device in a predetermined order to sequentially expose the photosensitive recording medium, wherein a blurred image is generated by applying an unsharp masking to the input image, a high-frequency component image representing a difference between the input image and the blurred image is generated, and the display image is generated by adding the high-frequency component image to the input image.

15. A non-transitory computer-readable storage medium storing a program for causing a computer to execute a process, the computer controlling an image exposure device including an image display device having a plurality of pixels, a support portion that supports a photosensitive recording medium for recording an image displayed on the image display device in a state in which an exposure surface of the photosensitive recording medium faces the image display device, and a limiting member that is provided between the image display device and the support portion and limits an angle of light radiated from the image display device to the photosensitive recording medium, the process comprising:

generating a display image in which an image quality of a color input image represented by input image data is deteriorated by emphasizing a density difference of a high-frequency component of the input image; and performing a control for generating an image of an R component, an image of a G component, and an image of a B component from the display image and sequentially displaying each of the image of the R component, the image of the G component, and the image of the B component on the image display device in a predetermined order to sequentially expose the photosensitive recording medium, wherein a blurred image is generated by applying an unsharp masking to the input image, a high-frequency component image representing a difference between the input image and the blurred image is generated, and the display image is generated by adding the high-frequency component image to the input image.

* * * * *